US012769187B2

(12) United States Patent
Nakano et al.

(10) Patent No.: US 12,769,187 B2
(45) Date of Patent: Oct. 20, 2026

(54) SURVEILLANCE CAMERA

(71) Applicant: i-PRO CO., LTD., Tokyo (JP)

(72) Inventors: Seiji Nakano, Fukuoka (JP); Hideaki Yamada, Fukuoka (JP); Koji Abe, Fukuoka (JP); Hikaru Konishi, Fukuoka (JP)

(73) Assignee: I-PRO CO., LTD., Tokyo (JP)

( * ) Notice: Subject to any disclaimer, the term of this patent is extended or adjusted under 35 U.S.C. 154(b) by 285 days.

(21) Appl. No.: 18/737,413

(22) Filed: Jun. 7, 2024

(65) Prior Publication Data

US 2024/0411208 A1 Dec. 12, 2024

(30) Foreign Application Priority Data

Jun. 9, 2023 (JP) ................................ 2023-095863

(51) Int. Cl.
*G03B 15/03* (2021.01)
*G03B 17/02* (2021.01)
*G03B 37/00* (2021.01)

(52) U.S. Cl.
CPC ............. *G03B 15/03* (2013.01); *G03B 17/02* (2013.01); *G03B 37/00* (2013.01); *G03B 2215/0503* (2013.01); *G03B 2215/0571* (2013.01)

(58) Field of Classification Search
CPC ........ G03B 15/03; G03B 17/02; G03B 37/00; G03B 2215/0503; G03B 2215/0571
See application file for complete search history.

(56) References Cited

U.S. PATENT DOCUMENTS 10,694,089 B2 * 6/2020 Huang .................. H04N 23/56
2009/0196593 A1 * 8/2009 Cheng .................... G03B 17/00 396/155
2011/0158637 A1 * 6/2011 Jung ...................... G03B 15/03 396/535
2014/0111970 A1 * 4/2014 Lu ..................... G02F 1/133611 362/97.1
2017/0302834 A1 * 10/2017 Lee .................... G02B 19/0066
2020/0236272 A1 * 7/2020 Tamaru .................. G02B 7/282
2021/0099625 A1 * 4/2021 Potter .................... H04N 23/56

FOREIGN PATENT DOCUMENTS

JP 2012-005054 A 1/2012
WO WO-2015058730 A1 * 4/2015 ............ H04N 23/56

* cited by examiner

*Primary Examiner* — Shahbaz Nazrul
(74) *Attorney, Agent, or Firm* — Greenblum & Bernstein, P.L.C.

(57) ABSTRACT

A surveillance camera includes a first infrared irradiation portion that irradiates first infrared light, a second infrared irradiation portion that irradiates second infrared light having a narrower irradiation angle than the first infrared light, a camera body including an imaging lens for allowing light to be incident from an irradiation region of at least one of the first and second infrared lights, and a dome cover covering the camera body. The first infrared irradiation portion includes a first light source of the first infrared light and a first pedestal on which the first light source is placed. The second infrared irradiation portion includes a second light source of the second infrared light and a second pedestal on which the second light source is placed. 10 The first light and second sources, which are provided adjacent to a side surface of the camera body, are disposed differently in an up-down direction.

8 Claims, 26 Drawing Sheets

SURVEILLANCE CAMERA

CROSS-REFERENCE TO RELATED APPLICATIONS

This application is based on and claims priority under 35 USC 119 from Japanese Patent Application No. 2023-095863 filed on Jun. 9, 2023, the contents of which are incorporated herein by reference.

TECHNICAL FIELD

The present disclosure relates to a surveillance camera.

BACKGROUND ART

Patent Literature 1 discloses a low illuminance compatible camera in which in a low illuminance environment for in-vehicle surveillance, high visibility with low power consumption is achieved for an imaging location where high visibility can be achieved under illumination with strong luminous intensity. The low illuminance compatible camera includes a wide-angle lens, a camera unit, and an illumination unit having a wide-angle LED and a narrow-angle LED. The wide-angle LED and the narrow-angle LED of the illumination unit both have the same luminous intensities, but have different emission lenses disposed on respective light emission surfaces. Therefore, the wide-angle LED in which the emission lens with a wide emission angle is used has a low emission intensity and a short irradiation distance. On the other hand, the narrow-angle LED in which the emission lens with a narrow emission angle is used has a high emission intensity and a long irradiation distance. A structure of the low illuminance compatible camera is disclosed in which the wide-angle LED and the narrow-angle LED are arranged side by side in a left-right direction with respect to the wide-angle lens.

CITATION LIST

Patent Literature

Patent Literature 1: JP2012-5054A

SUMMARY OF INVENTION

Incidentally, even in an outdoor surveillance camera in which an imaging unit and an emission lens are covered with a camera case and a dome cover, a wide-angle lens may be provided on one of pedestals disposed to sandwich the imaging unit in the camera case, and a narrow-angle lens may be provided on the other pedestal. However, since heights and sizes of the wide-angle lens and the narrow-angle lens are different, if the wide-angle lens and the narrow-angle lens are disposed on the pedestals that are at the same height with respect to the imaging unit, there is a possibility that the wide-angle lens and narrow-angle lens interfere with the dome cover.

The present disclosure is proposed in view of the above-described circumstances in the related art, and an object thereof is to provide a surveillance camera that can prevent interference between a dome cover and a wide-angle lens or a narrow-angle lens.

The present disclosure provides a surveillance camera including a first infrared irradiation portion that irradiates first infrared light, a second infrared irradiation portion that irradiates second infrared light having a narrower irradiation angle than the first infrared light, a camera body including an imaging lens, the imaging lens allowing light to be incident from an irradiation region of at least one of the first infrared light and the second infrared light, and a dome cover that covers the camera body. The first infrared irradiation portion includes a first light source of the first infrared light and a first pedestal on which the first light source is placed. The second infrared irradiation portion includes a second light source of the second infrared light and a second pedestal on which the second light source is placed. The first light source and the second light source, which are provided adjacent to a side surface of the camera body, are disposed differently in an up-down direction.

According to the present disclosure, interference between the dome cover and the wide-angle lens or the narrow-angle lens can be prevented.

DESCRIPTION OF EMBODIMENTS

Figure 1:
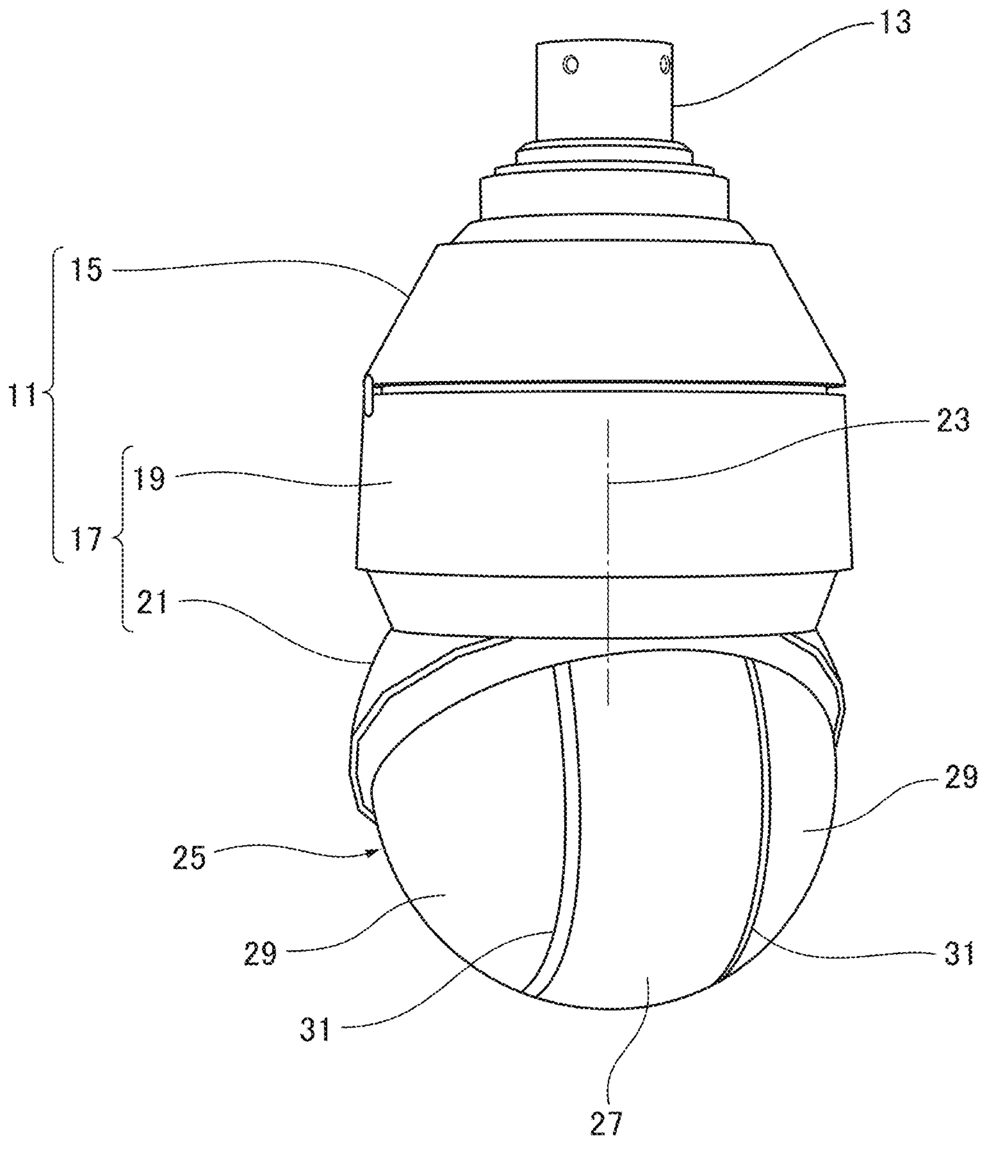
FIG. 1 is an external front view of a surveillance camera according to a first embodiment.

Hereinafter, embodiments that specifically disclose a surveillance camera according to the present disclosure will be described in detail with reference to the drawings as appropriate. Detailed descriptions more than necessary may be omitted. For example, detailed descriptions of already well-known matters and redundant descriptions of substantially the same configuration may be omitted by applying the same reference numerals. This is to avoid redundancy of the following description and facilitate understanding of a person skilled in the art. The accompanying drawings and the following description are provided for a person skilled in the art to sufficiently understand the present disclosure, and are not intended to limit the subject matter described in the claims.

FIG. 1 is an external front view of a surveillance camera 11 according to a first embodiment. The surveillance camera 11 includes a bracket 15 fixed to a support pipe 13 or the like, and a main case 17 provided with a camera body 33 (see FIG. 2) and suspended and supported by the bracket 15. The main case 17 includes a rotation pedestal 19 fixed to the bracket 15 in a suspended state, and a camera case 21 rotatable relative to the rotation pedestal 19 and supported in a suspended state. The camera case 21 is rotatably supported on the rotation pedestal 19 about a pan axis 23. The pan axis 23 is a virtual axis along a vertical direction.

The surveillance camera 11 further includes a dome cover 25 fixed to the camera case 21. The dome cover 25 includes an imaging window portion 27 in a center and left and right light projecting window portions 29 sandwiching the imaging window portion 27. The imaging window portion 27 and the light projecting window portions 29 are connected by coupling bodies 31.

The support pipe 13 is fixed to, for example, a ceiling, a wall, or a pole. The bracket 15 is formed in a conical shape, for example. In addition, the bracket 15 may be a support fitting that has a locking structure for locking to the rotation pedestal 19 on a lower surface side (that is, a main case 17 side) and is fixed to a pole, a wall, or the like. The rotation pedestal 19 supported by the bracket 15 has a cylindrical outer shape having a diameter substantially equal to a diameter of a bottom surface of a conical portion of the bracket 15.

Figure 2:
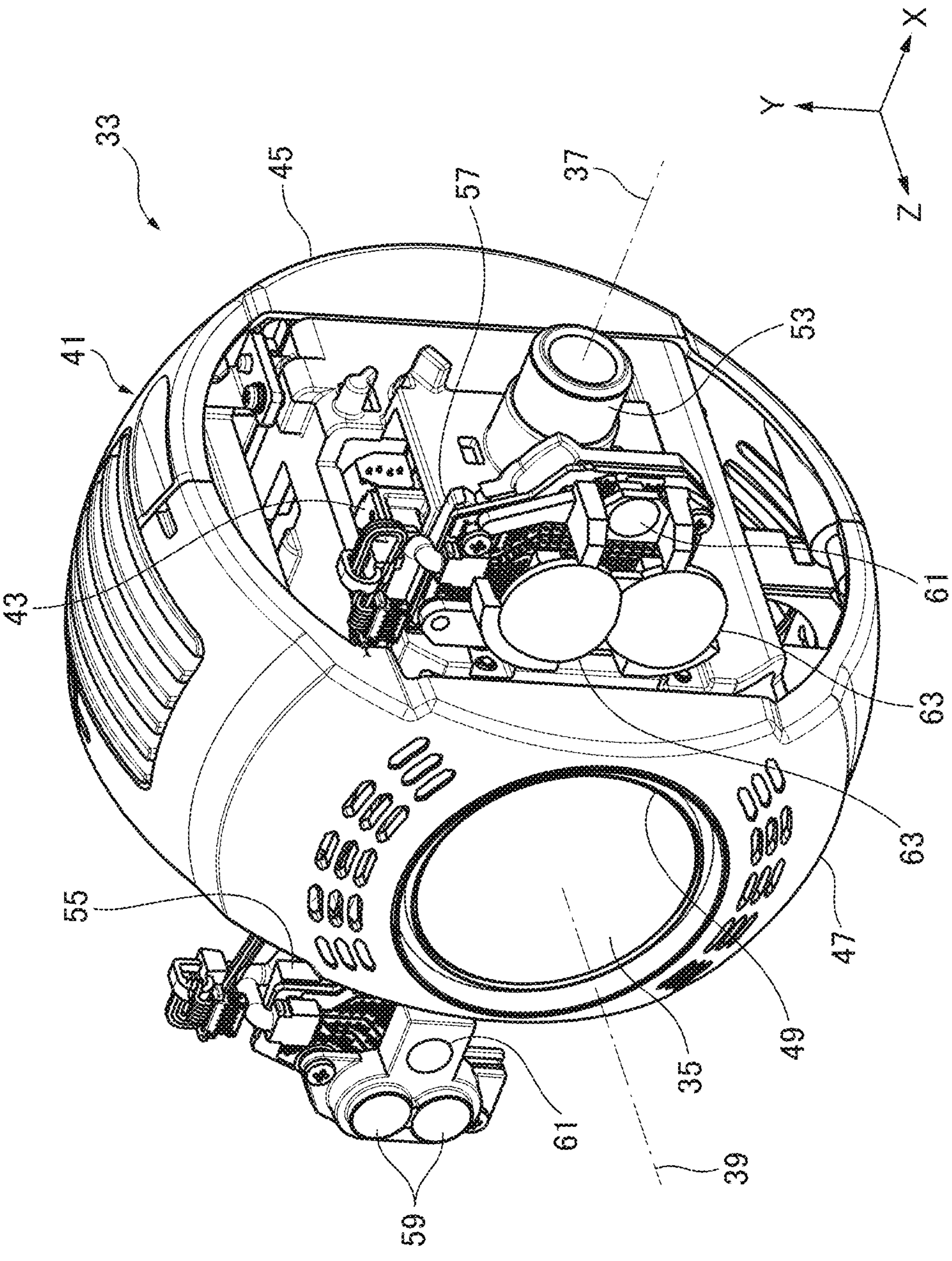
FIG. 2 is a perspective view of a camera body.

FIG. 2 is a perspective view of the camera body 33. The camera body 33 is housed in the camera case 21 (see FIG. 1). The camera body 33 includes an imaging lens 35 into which light from an irradiation region of at least one of first infrared light (see below) and second infrared light (see below) is incident, and is rotatably supported by the camera case 21 about a tilt axis 37. The tilt axis 37 is a virtual axis perpendicular to the pan axis 23 (see FIG. 1). The camera body 33 is rotatably supported by the camera case 21 (see FIG. 1) about the tilt axis 37.

Directions in the present specification follow directions of arrows attached to X, Y, and Z axes shown in drawings. Here, an X direction indicates a right direction, a Y direction indicates a front direction, and a Z direction indicates a down direction. Therefore, although not shown, a −X direction is a left direction, a −Y direction is a rear direction, and the −Z direction is an up direction. A circle surrounding a point attached to an intersection of orthogonal axes points toward the front side of the paper and indicates a direction where the arrow extends, and a circle surrounding the X attached to an intersection of the orthogonal axes points toward the rear side of the paper and indicates a direction where the arrow extends. In the following description, a direction along a lens center axis 39 of the camera body 33 is defined as an up-down direction.

The camera body 33 at least includes a substantially cylindrical (barrel-shaped) camera cover 41 in which a pair of parallel surfaces sandwiching a center of a spherical surface (in other words, a sphere) cuts the spherical surface, and a camera unit body 43 whose central portion is covered by the camera cover 41. The camera cover 41 is implemented by combining a rear cover 45 and a front cover 47, which are divided into upper and lower parts along a plane perpendicular to the lens center axis 39. An imaging lens opening 49 in which the imaging lens 35 is exposed is formed in the front cover 47. The imaging lens 35 exposed in the imaging lens opening 49 is disposed in the imaging window portion 27, so that imaging light from a subject (in other words, the light from the irradiation region of at least one of the first infrared light (see below) and the second infrared light (see below)) is allowed to be incident.

A wide-angle side fitting 83 (see FIGS. 8A and 8B) and a narrow-angle side fitting 79 (see FIGS. 8A and 8B), which will be described later, are fixed to the camera unit body 43. A driven shaft 51 (see FIGS. 8A and 8B) whose axis is the tilt axis 37 projects toward the left side of the wide-angle side fitting 83. A main shaft 53 whose axis is the tilt axis 37 projects toward the right side of the narrow-angle side fitting 79. The main shaft 53 and the driven shaft 51 of the camera body 33 are rotatably supported by a bearing (not shown) provided in the camera case 21 so as to be tilted and rotated.

The camera body 33 has a first LED pedestal 55 protruding from the left side of the camera cover 41 and a second LED pedestal 57 protruding from the right side of the camera cover 41. The first LED pedestal 55 is an example of a first pedestal. The second LED pedestal 57 is an example of a second pedestal. The first LED pedestal 55 is formed on the wide-angle side fitting 83 (see FIGS. 8A and 8B). The second LED pedestal 57 is formed on the narrow-angle side fitting (see FIGS. 8A and 8B). The first LED pedestal 55 is provided with two wide-angle illumination portions 59 and one intermediate-distance illumination portion 61. The two wide-angle illumination portions 59 are examples of a first infrared irradiation portion. The second LED pedestal 57 is provided with two narrow-angle illumination portions 63 and one intermediate-distance illumination portion 61. The two narrow-angle illumination portions 63 are examples of a second infrared irradiation portion. The first LED pedestal 55 is arranged to face one of the light projecting window portions 29. The second LED pedestal 57 is arranged to face the other light projecting window portion 29. Accordingly, light from LEDs disposed on the LED pedestals can be irradiated from the light projecting window portions 29 toward the subject. A light emission diode (LED) is an example of each of a first light source and a second light source.

Figure 3:
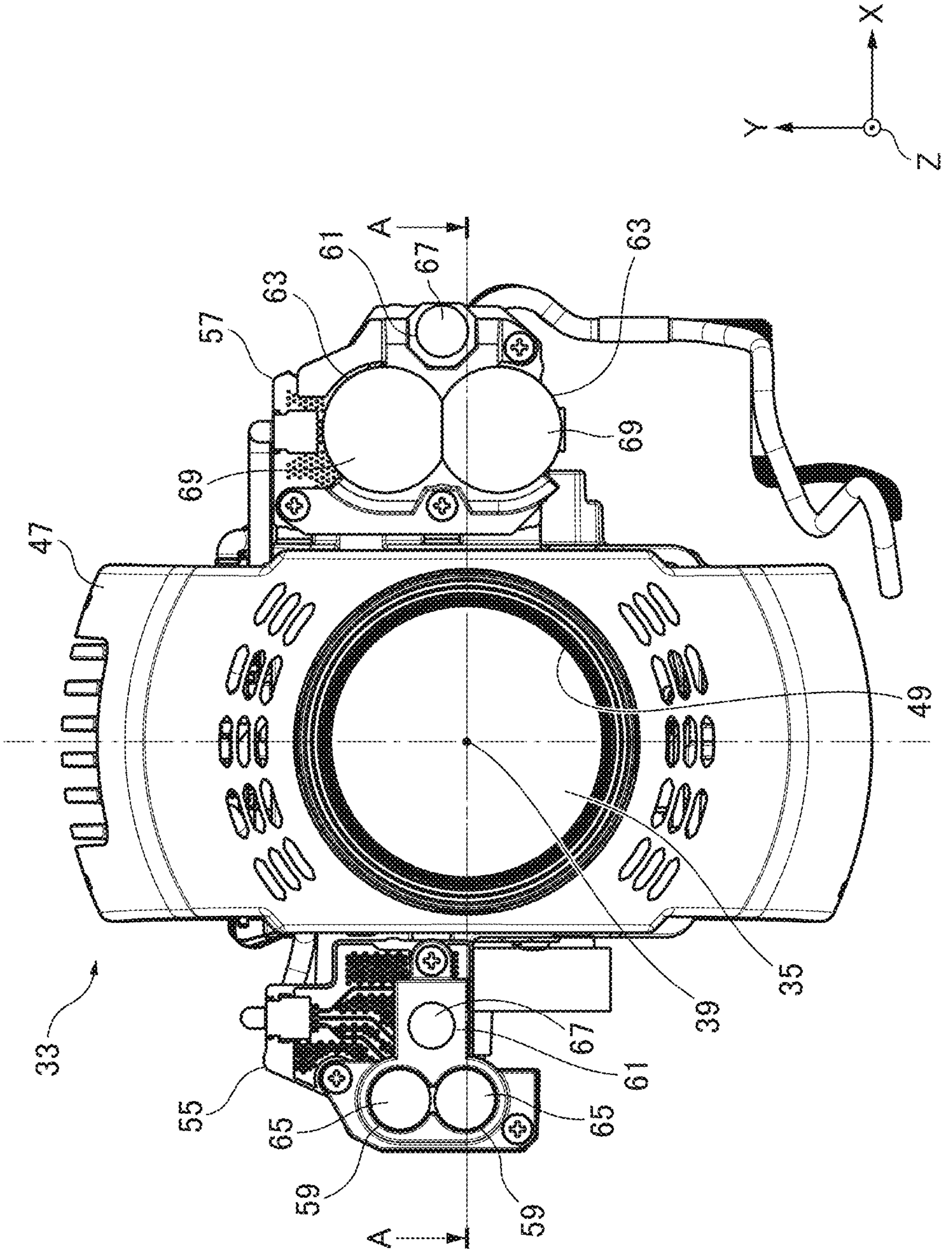
FIG. 3 is a bottom view of the camera body shown in FIG. 2.

FIG. 3 is a bottom view of the camera body 33 shown in FIG. 2. In the camera body 33, three LEDs that emit infrared light for night photography and the like are disposed on each of the first LED pedestal 55 and the second LED pedestal 57. Two wide-angle lenses 65 corresponding to two of the three LEDs and an intermediate lens 67 corresponding to the remaining one of the three LEDs and illuminating a subject at an intermediate distance are disposed on the first LED pedestal 55. Two narrow-angle lenses 69 corresponding to two of the three LEDs and the intermediate lens 67 corresponding to the remaining one of the three LEDs and illuminating the subject at the intermediate distance are disposed on the second LED pedestal 57. The LEDs are provided with lenses in one-to-one correspondence. That is, the number of LEDs and the number of lenses are the same, three each.

Figure 4:
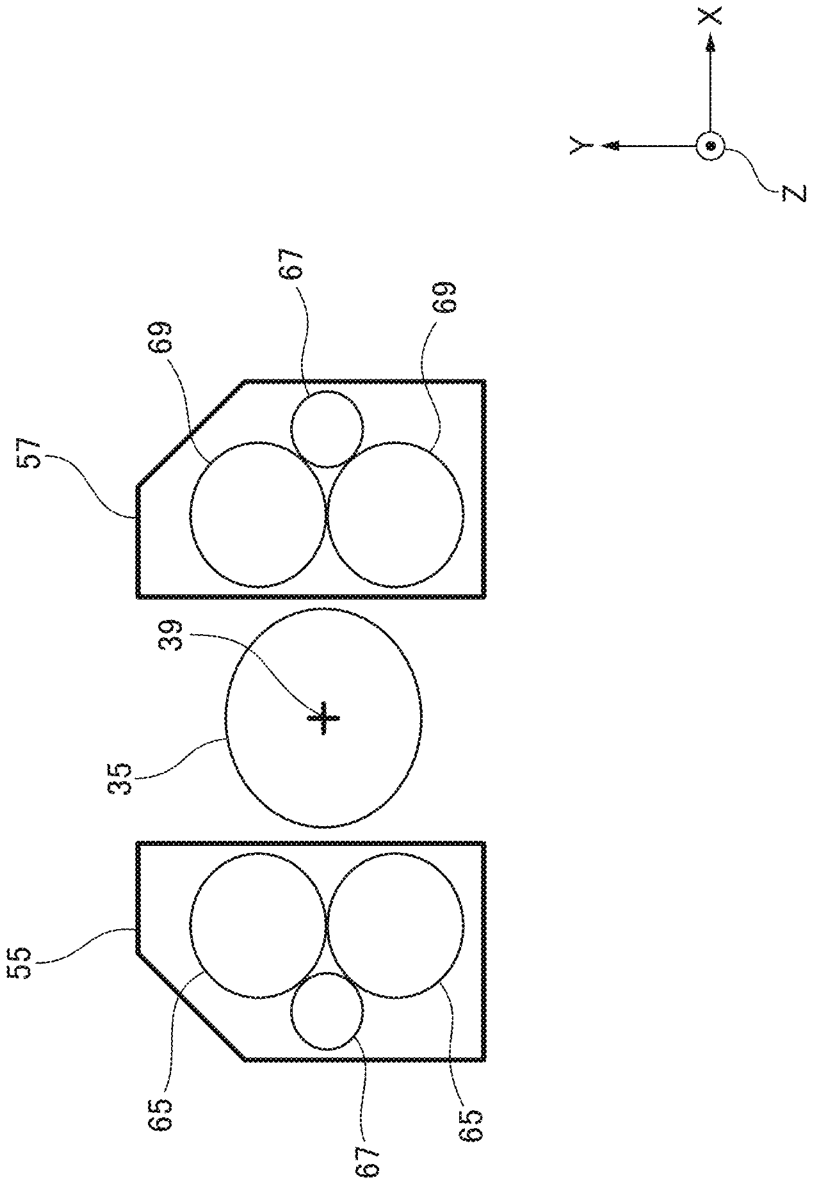
FIG. 4 is a schematic diagram illustrating disposing of lenses on pedestals.

FIG. 4 is a schematic diagram illustrating disposing of the lenses on the pedestals. That is, in the camera body 33, the two wide-angle illumination portions 59 are collected on the first LED pedestal 55 on the left side with the imaging lens 35 sandwiched, and the two narrow-angle illumination portions 63 are collected on the second LED pedestal 57 on the right side with the imaging lens 35 sandwiched. On the other hand, the two intermediate-distance illumination portions 61 are distributed such that one is disposed on the first LED pedestal 55 on the left side with the imaging lens 35 sandwiched, and the other is disposed on the second LED pedestal 57 on the right side with the imaging lens 35 sandwiched. As described later, disposing of the intermediate-distance illumination portion 61 is not limited thereto.

In the surveillance camera 11, by collectively disposing the narrow-angle lenses 69, which require higher irradiation precision, only on the second LED pedestal 57, strict optical axis adjustment can be performed only on the second LED pedestal 57. In addition, only the second LED pedestal 57 requires high component disposing precision.

Figure 5:
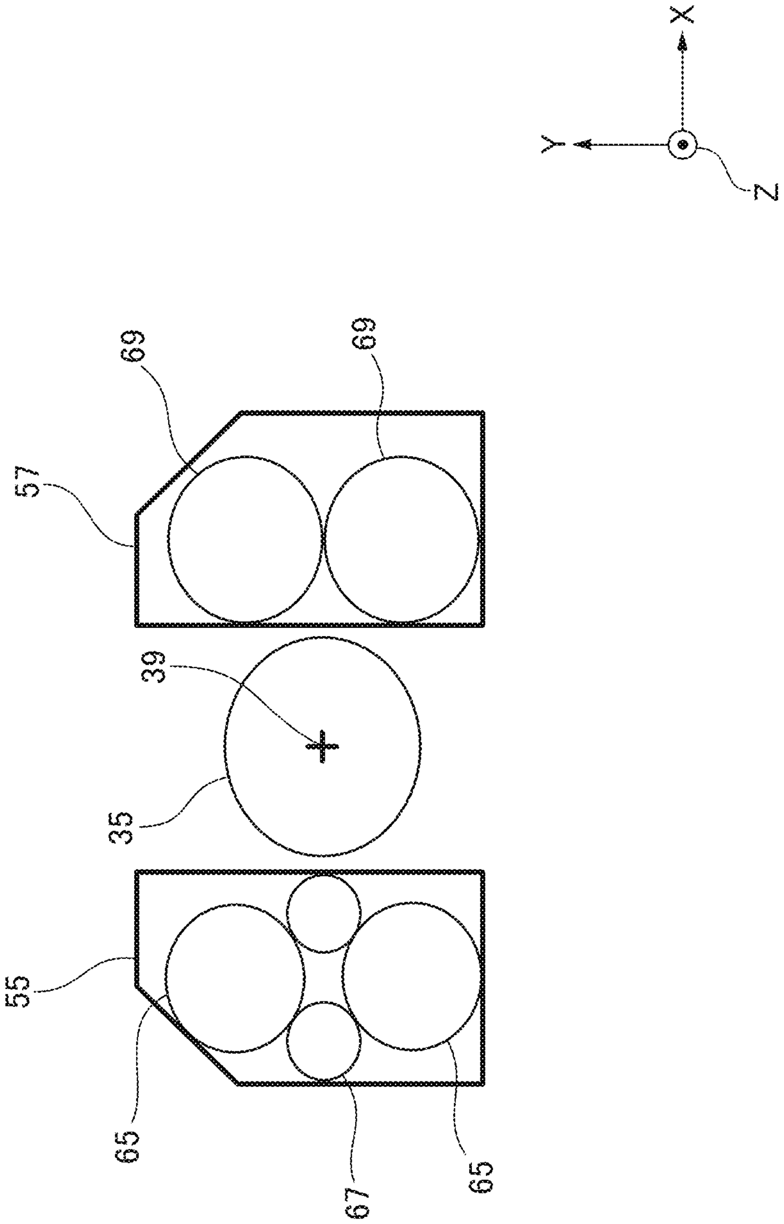
FIG. 5 is a schematic diagram showing a modification of lens disposing.

FIG. 5 is a schematic diagram showing a modification of lens disposing. In the surveillance camera 11, by moving the left and right intermediate lenses 67 to one side, it is possible to prioritize adjustment and the component disposing precision. That is, by collecting only the two intermediate lenses 67 on the first LED pedestal 55, the second LED pedestal 57 can be configured to be more specialized for narrow-angle adjustment and the component disposing precision. The first LED pedestal 55 can be configured to be more specialized for wide-angle and intermediate-distance adjustment and the component disposing precision. Whether to adopt the configuration of the first embodiment (FIG. 4) or the configuration of the modification (FIG. 5) is determined by the following two constraint conditions. A first constraint condition is a size constraint when mounted on the LED pedestal. A second constraint condition is a thermal constraint (that is, ease of heat dissipation) for changing a ratio of the LEDs, which are heat sources, from 3:3 to 2:4. That is, in the configuration of the first embodiment (see FIG. 4), a priority is given to the size and heat dissipation performance. On the other hand, in the configuration of the modification (see FIG. 5), a priority is given to adjustment and the component disposing precision.

Figure 6:
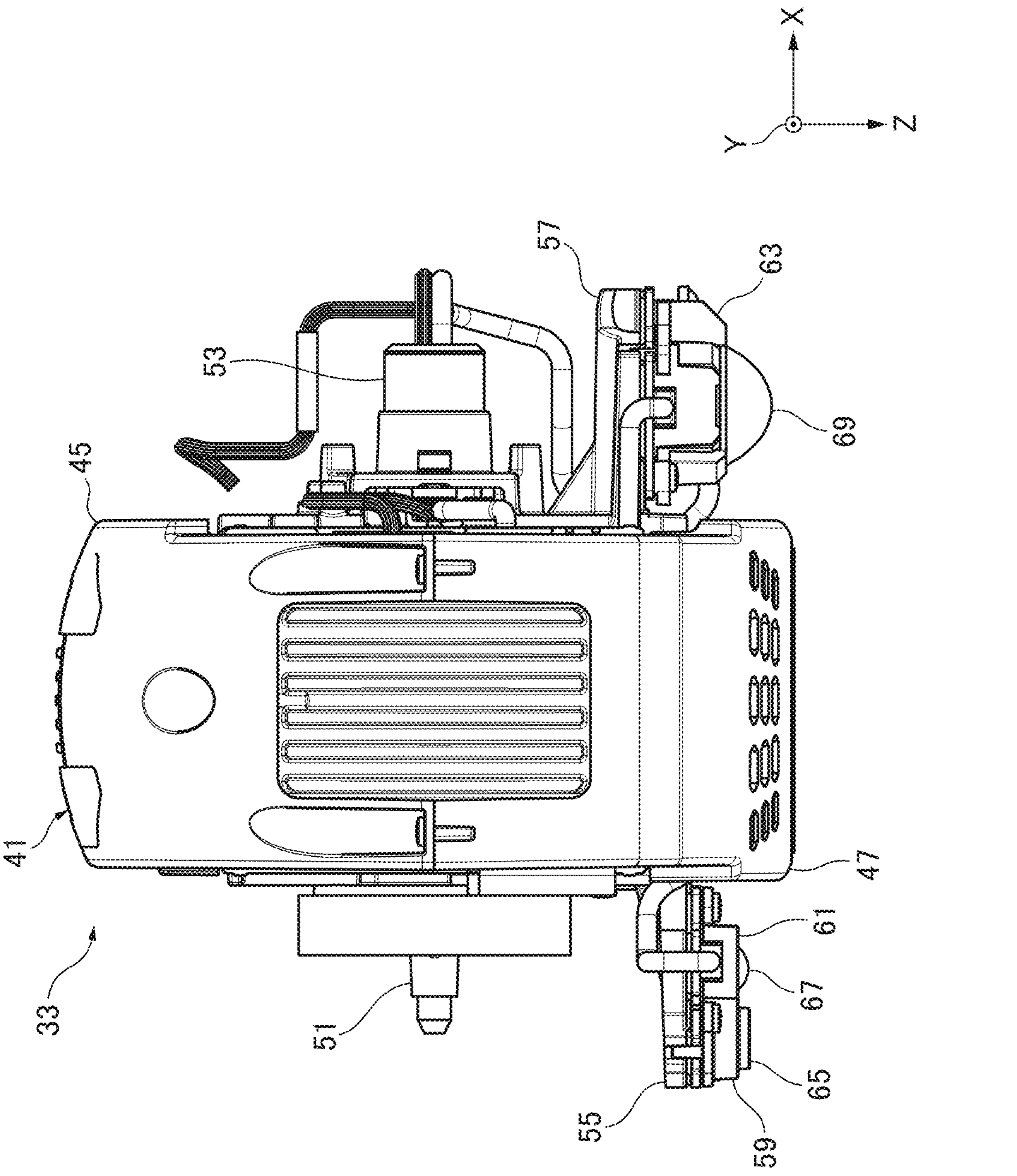
FIG. 6 is a front view of the camera body shown in FIG. 3.

FIG. 6 is a front view of the camera body 33 shown in FIG. 3. When viewed from the front, an imaging direction of the camera body 33 faces downward. As shown in FIG. 6, in the camera body 33, the first LED pedestal 55 and the second LED pedestal 57, which sandwich the camera body 33 in the left-right direction, are disposed differently in the up-down direction. Accordingly, an LED 71*a* provided on the first LED pedestal 55 (see FIGS. 8A and 8B) and an LED 71*b* provided on the second LED pedestal 57 (see FIGS. 8A and 8B) are disposed differently in the up-down direction. Specifically, the first LED pedestal 55 is located lower than the second LED pedestal 57. Therefore, the LED 71*a* provided on the first LED pedestal 55 (see FIGS. 8A and 8B) is located lower than the LED 71*b* provided on the second LED pedestal 57 (see FIGS. 8A and 8B).

Figure 7:
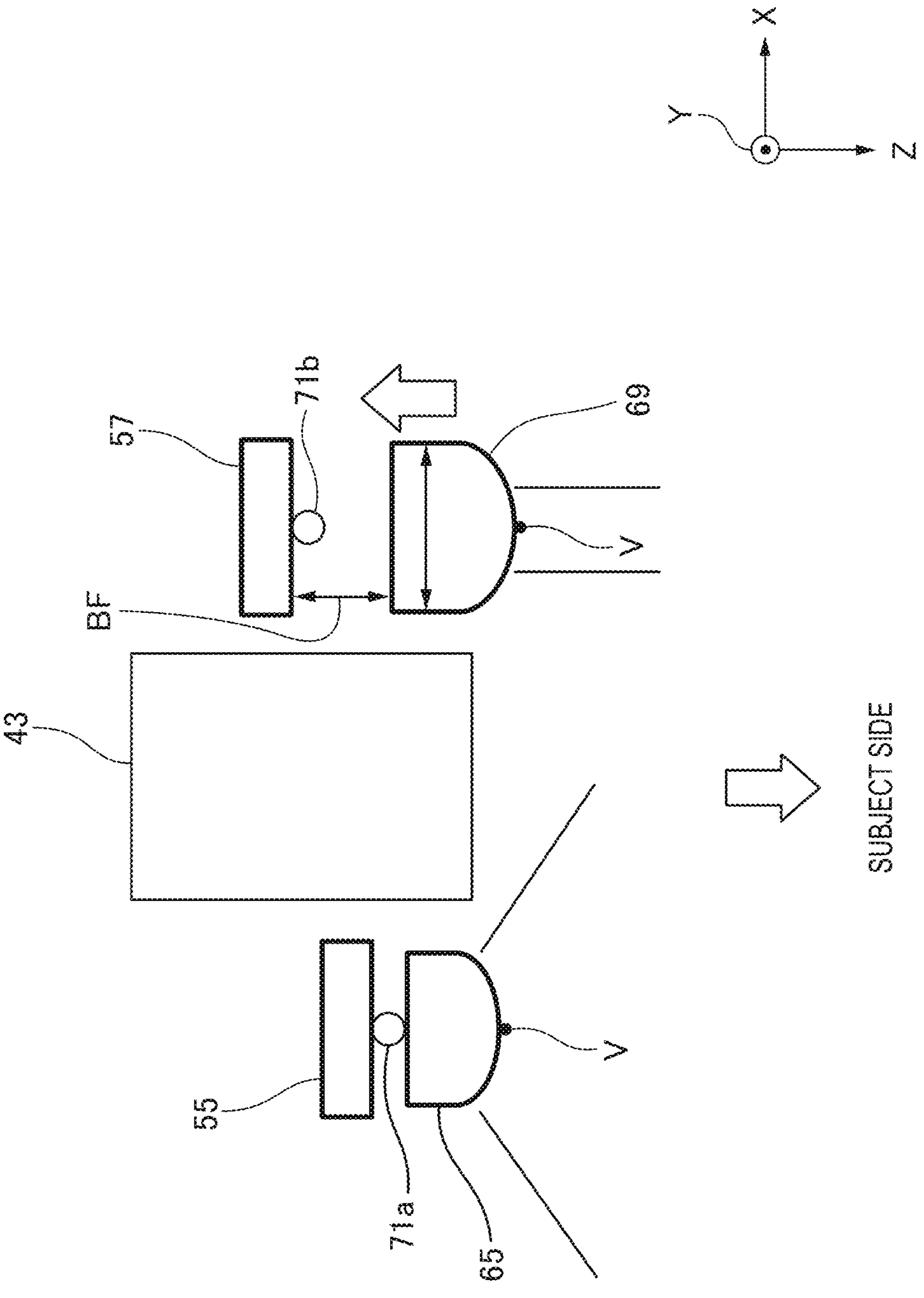
FIG. 7 is a schematic diagram showing a difference in positions of left and right pedestals.

FIG. 7 is a schematic diagram showing a difference in positions of the left and right pedestals. The LED 71*a* provided on the first LED pedestal 55 and the LED 71*b* provided on the second LED pedestal 57 are respectively mounted on illumination boards 73 (see FIGS. 8A and 8B). The illumination boards 73 are omitted from illustration in FIG. 7. The wide-angle lens 65 whose optical axis 75 (see FIGS. 8A and 8B) is aligned with the LED 71*a* is mounted on the illumination board 73 provided on the first LED pedestal 55. Similarly, the narrow-angle lens 69 whose optical axis 75 (see FIGS. 8A and 8B) is aligned with the LED 71*b* is mounted on the illumination board 73 provided on the second LED pedestal 57. The illumination board 73 is attached parallel to and in close contact with an installation surface 77 (see FIGS. 8A and 8B) of the pedestal. Therefore, the LEDs 71*a* and 71*b* provided on the pedestals located at different positions in the up-down direction are disposed differently in the up-down direction. By using pedestals different in the up-down direction, the left and right lenses can be disposed separately. That is, a degree of design freedom in disposing the lens is increased.

For example, as shown in FIG. 7, the wide-angle lens 65 is disposed lower than the narrow-angle lens 69, making it easier to achieve a suitable irradiation angle. Positions in the up-down direction of the wide-angle lens 65 and the narrow-angle lens 69 are not limited thereto. The wide-angle lens 65 may be disposed higher than the narrow-angle lens 69 as long as vignetting does not occur. In the first embodiment, as shown in FIG. 7, a position of a vertex V of the narrow-angle lens 69 is closer to the subject than that of the wide-angle lens 65. Accordingly, a vertex of the wide-angle lens 65 is disposed higher than the vertex of the narrow-angle lens 69, thereby contributing to making an overall structure more compact.

The narrow-angle lens 69 has optical characteristics in which a back focal length is longer than that of the wide-angle lens 65, and needs to irradiate necessary irradiation power over a long distance. Therefore, the vertex V of the narrow-angle lens 69 becomes higher (longer) from the installation surface 77, and an aperture tends to increase. That is, brightness (Fno) of the narrow-angle lens 69 is expressed as (Fno)=f(focal length)/fai. That is, when using a long-distance lens, f becomes long and the necessary pupil diameter becomes large. Therefore, in a distance relationship between the lens and the LED, a distance between the narrow-angle lens 69 and the LED 71*b* is set longer than a distance between the wide-angle lens 65 and the LED 71*a*. In the surveillance camera 11, by disposing the narrow-angle lens 69 and the installation surface 77 of the LED 71*b* on an upper side, the narrow-angle lens 69 does not collide forward and interference with the dome cover 25 is less likely to occur. The above disposing also contributes to minimizing (compacting) the overall structure.

Figure 8A:
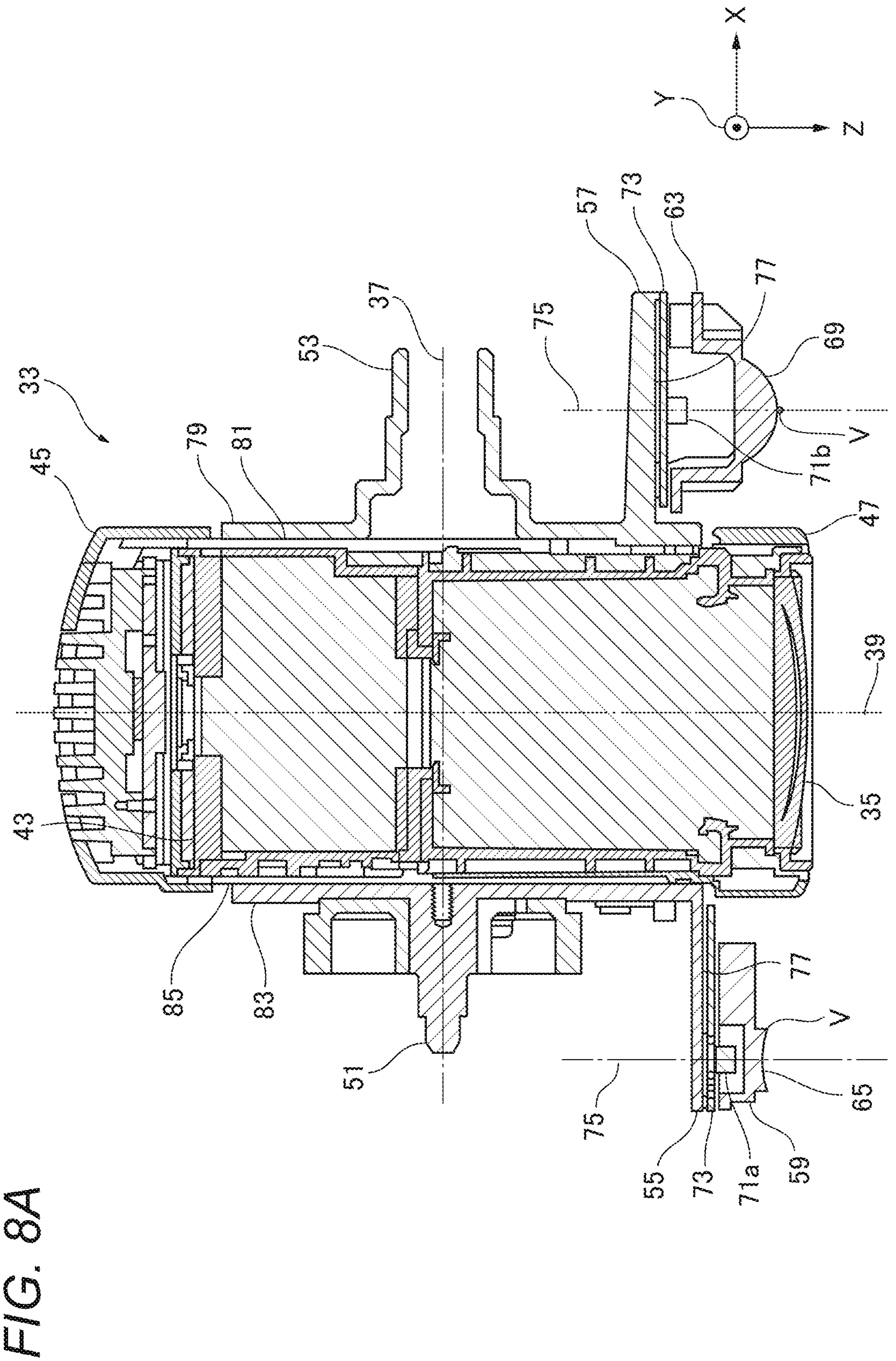
FIG. 8A is a diagram showing an example of an A-A cross section in FIG. 3.
Figure 8B:
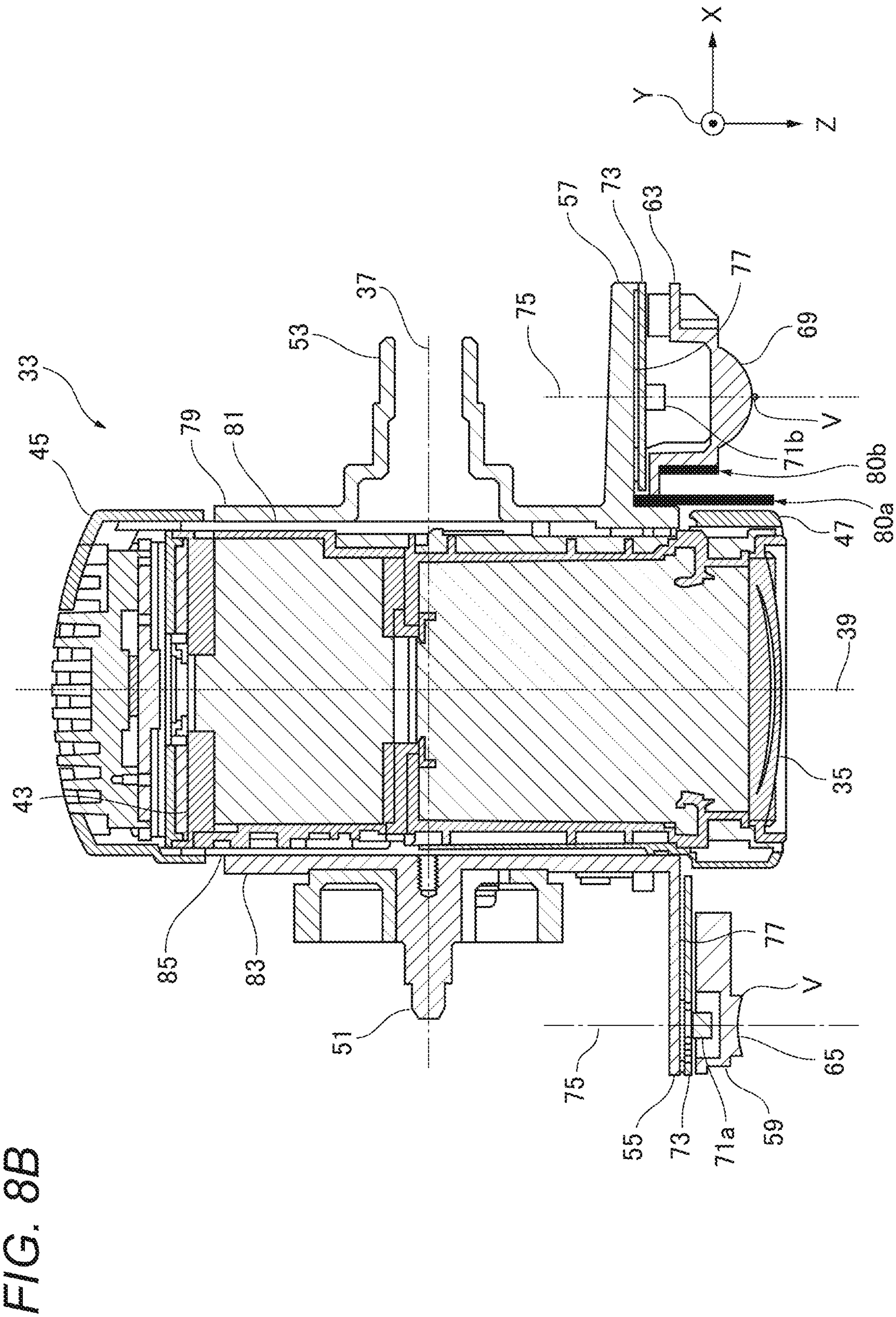
FIG. 8B is a diagram showing another example of the A-A cross section in FIG. 3.

FIG. 8A is a diagram showing an A-A cross section in FIG. 3. The main shaft 53 of the camera body 33 is formed by the narrow-angle side fitting 79 on which the second LED pedestal 57 is formed. The second LED pedestal 57 is formed by bending a lower end side of the narrow-angle side fitting 79 so as to protrude to the right direction at a substantially right angle with respect to a reference surface 81 (see below). The camera unit body 43 is provided with the reference surface 81 that is parallel to and set at a constant distance from the lens center axis 39. The narrow-angle side fitting 79 on which the main shaft 53 is formed abuts the reference surface 81. The reference surface 81 and a surface of the narrow-angle side fitting 79 that abuts the reference surface 81 are fixed using a fastening member such as a screw.

On the other hand, the driven shaft 51 of the camera body 33 is formed on the wide-angle side fitting 83 on which the first LED pedestal 55 is formed. The first LED pedestal 55 is formed by bending a lower end side of the wide-angle side fitting 83 so as to protrude to the left direction at a substantially right angle with respect to a dependent surface 85 (see below). The camera unit body 43 is provided with the dependent surface 85. The wide-angle side fitting 83 on which the driven shaft 51 is formed is indirectly fixed to the dependent surface 85 via intermediate members (dependent components). In the first embodiment, the intermediate members are, for example, the narrow-angle side fitting 79 and a rubber washer which will be described later.

Figure 9:
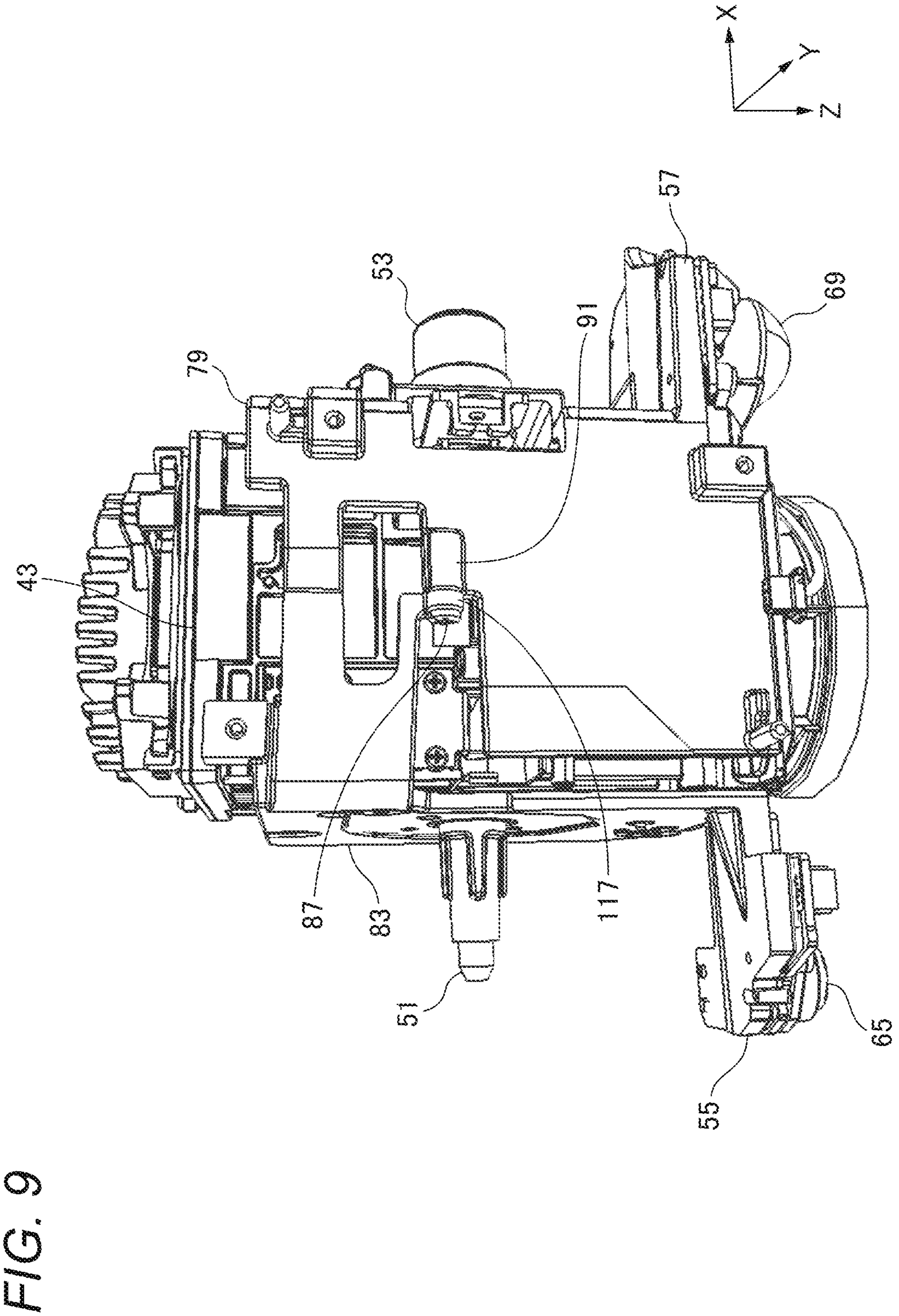
FIG. 9 is a perspective view of a camera unit body with a wide-angle side fitting and a narrow-angle side fitting attached, viewed from a front side.
Figure 10:
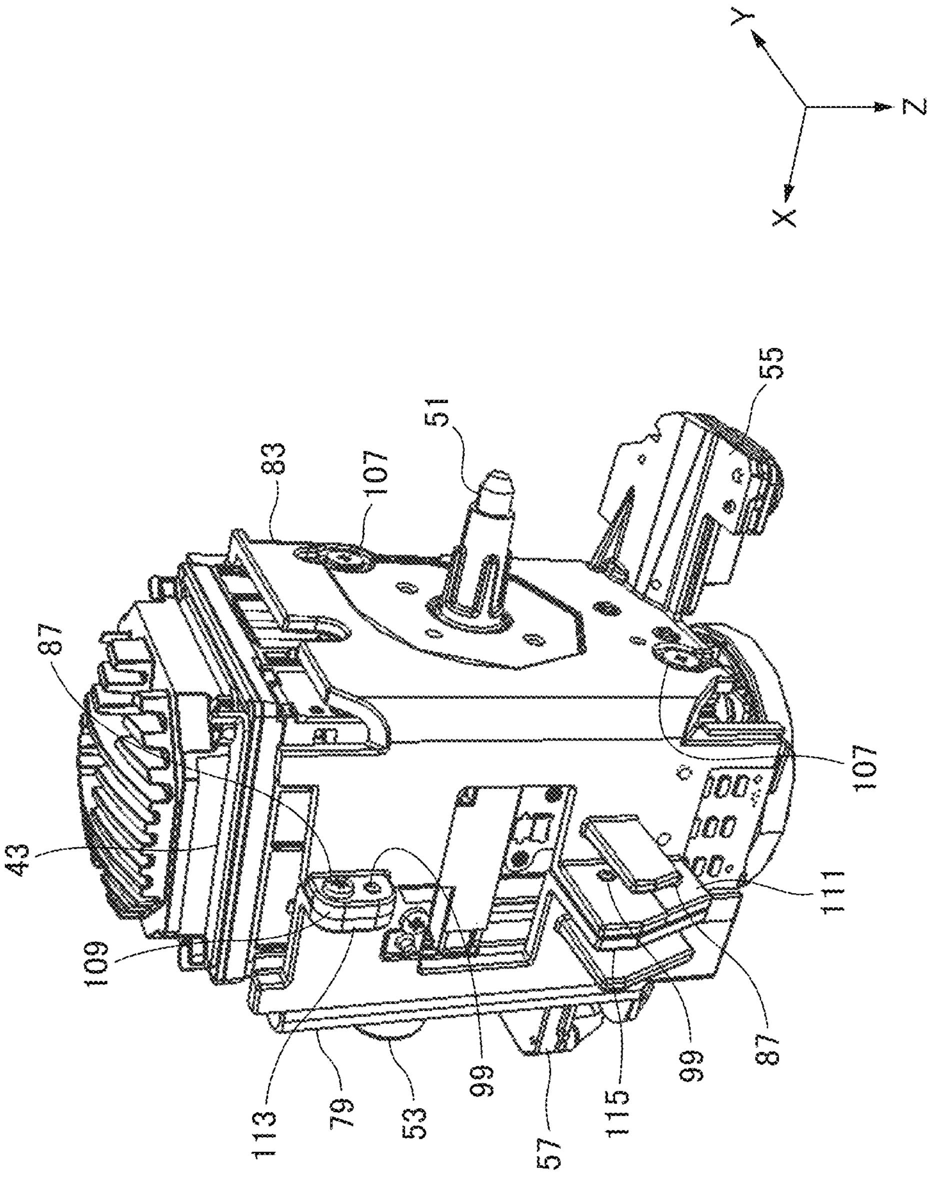
FIG. 10 is a perspective view of the camera unit body with the wide-angle side fitting and the narrow-angle side fitting attached, viewed from a rear side.
Figure 11:
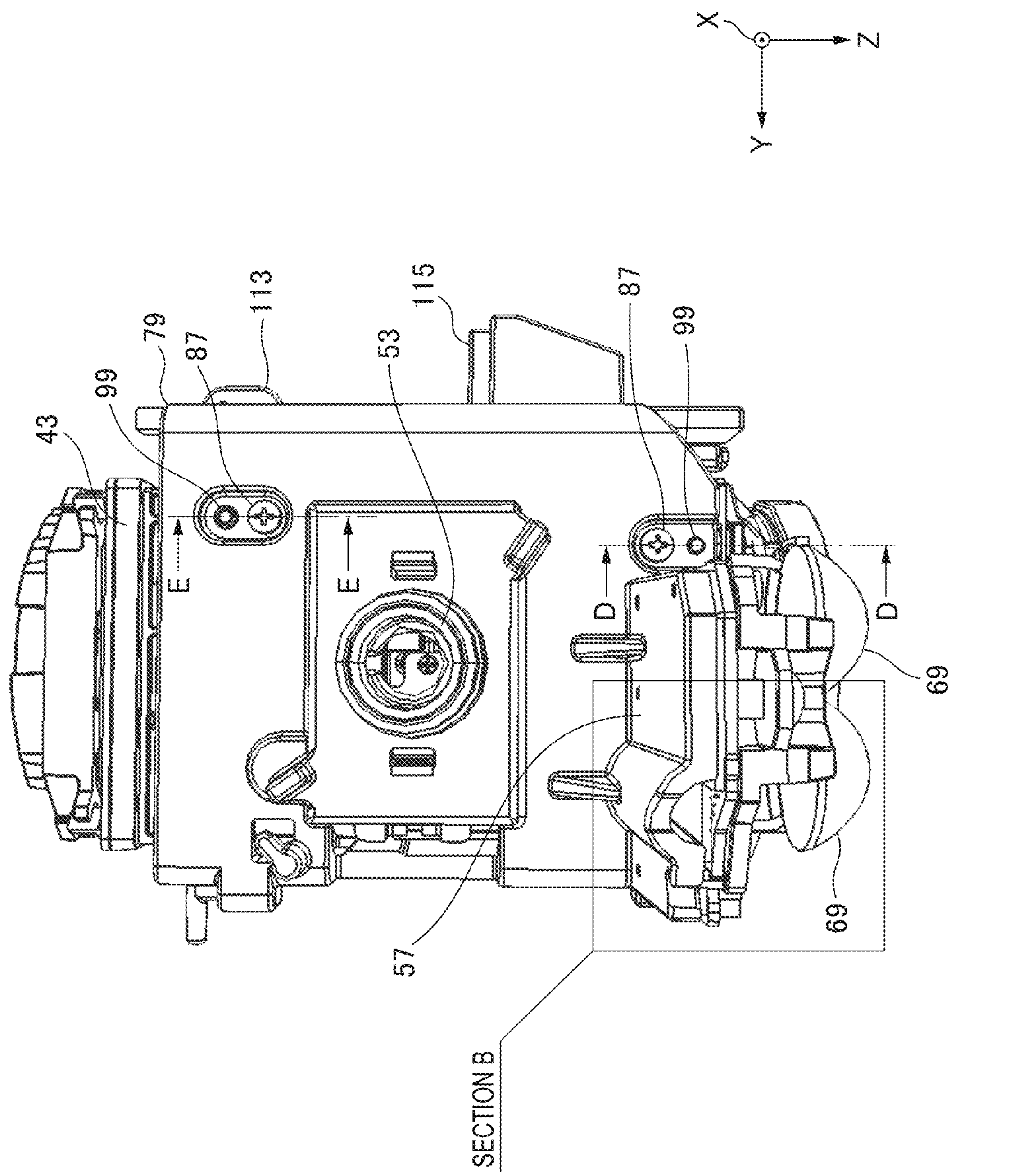
FIG. 11 is a perspective view of the camera unit body with the narrow-angle side fitting attached, viewed from a right side.
Figure 12:
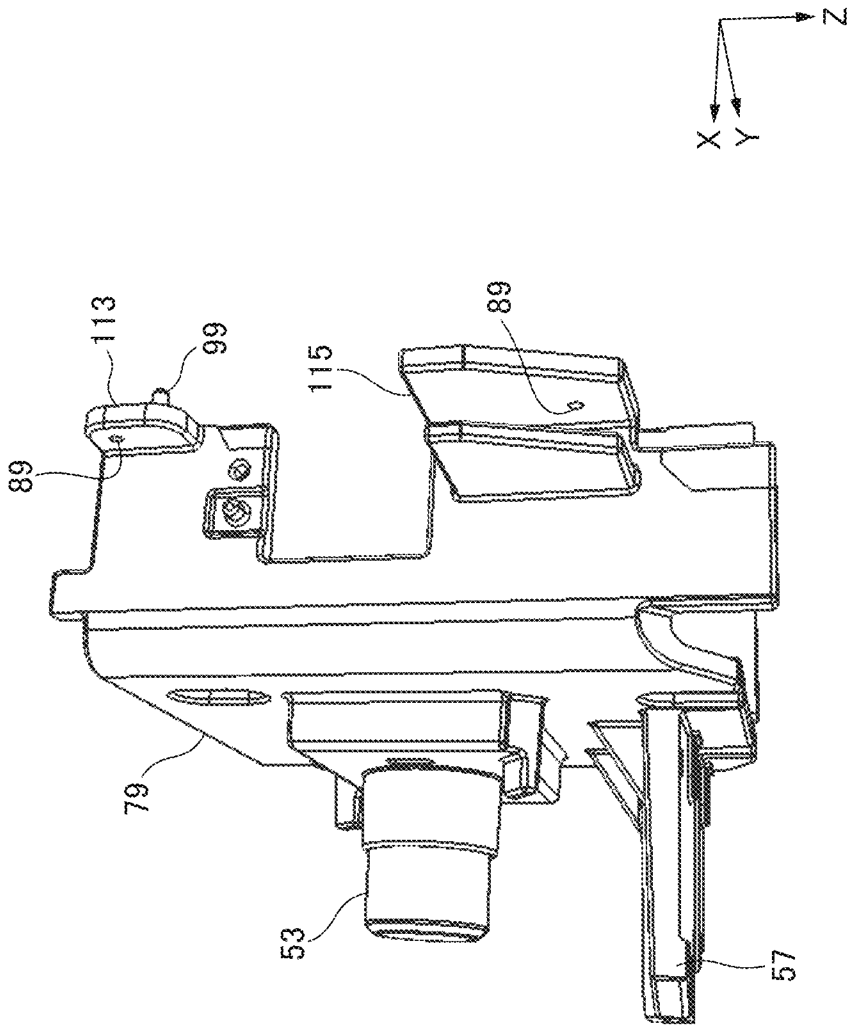
FIG. 12 is a perspective view of a right side surface of the narrow-angle side fitting, viewed diagonally from the rear side.
Figure 13:
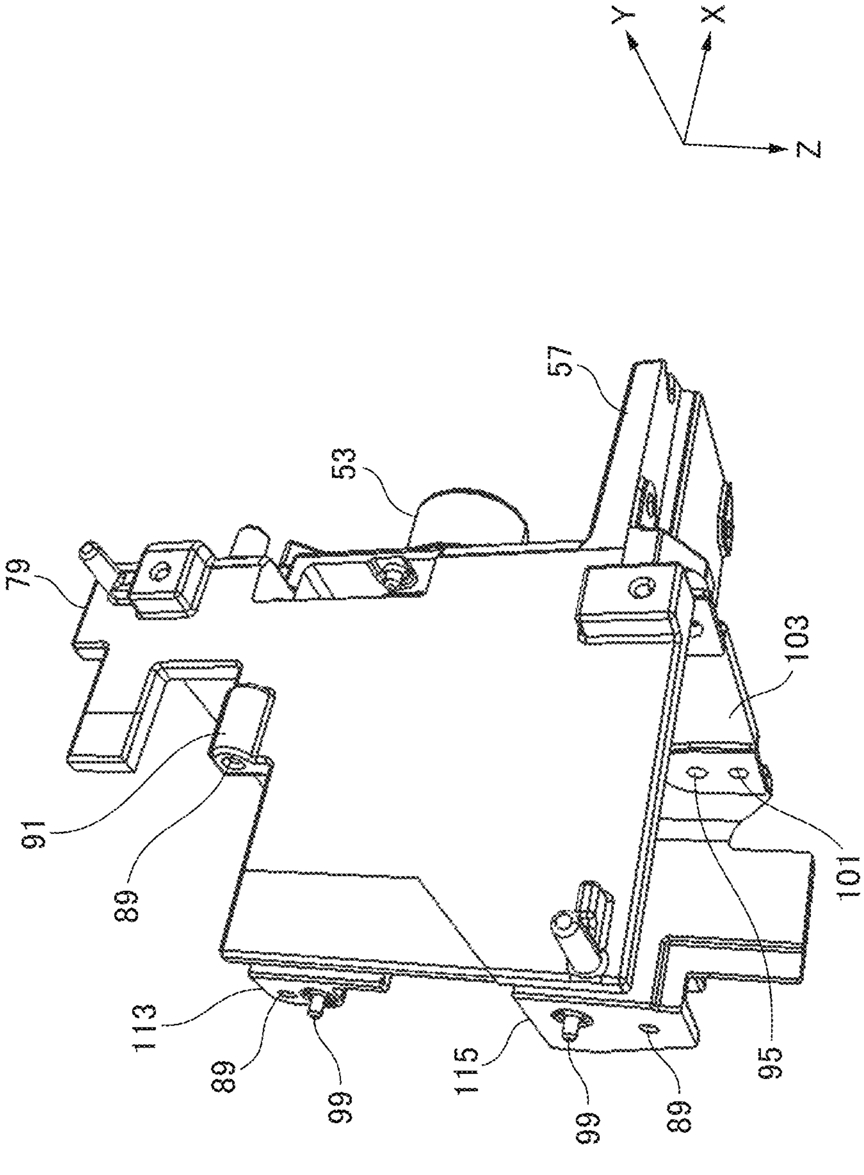
FIG. 13 is a perspective view of a front surface of the narrow-angle side fitting, viewed diagonally in a lower front side.

FIG. 9 is a perspective view of the camera unit body 43 with the wide-angle side fitting 83 and the narrow-angle side fitting 79 attached, viewed from the front side. FIG. 10 is a perspective view of the camera unit body 43 with the wide-angle side fitting 83 and the narrow-angle side fitting 79 attached, viewed from the rear side. FIG. 11 is a perspective view of the camera unit body 43 with the narrow-angle side fitting 79 attached, viewed from the right side. FIG. 12 is a perspective view of a right side surface of the narrow-angle side fitting 79, viewed diagonally from the rear side. FIG. 13 is a perspective view of a front surface of the narrow-angle side fitting 79, viewed diagonally in a lower front side.

A front side of the wide-angle side fitting 83 is fixed, by a screw 87, to the narrow-angle side fitting 79 fixed to the camera unit body 43. A rear side of the wide-angle side fitting 83 is fixed, by the screw 87 located on each of upper and lower locations, to the narrow-angle side fitting 79 fixed to the camera unit body 43. The right side surface of the narrow-angle side fitting 79 is fixed to the camera unit body 43 by the screws 87 in which one is at the lower location and the other is at the upper location.

In the narrow-angle side fitting 79, female threaded portions 89 into which the screws 87 for fixing the wide-angle side fitting 83 shown in FIG. 10 in the upper and lower locations are screwed are formed at the upper and lower locations. In the narrow-angle side fitting 79, the female threaded portion 89 into which the screw 87 for fixing the wide-angle side fitting 83 shown in FIG. 9 at the top in the up-down direction is screwed is formed in a boss portion 91.

Figure 14:
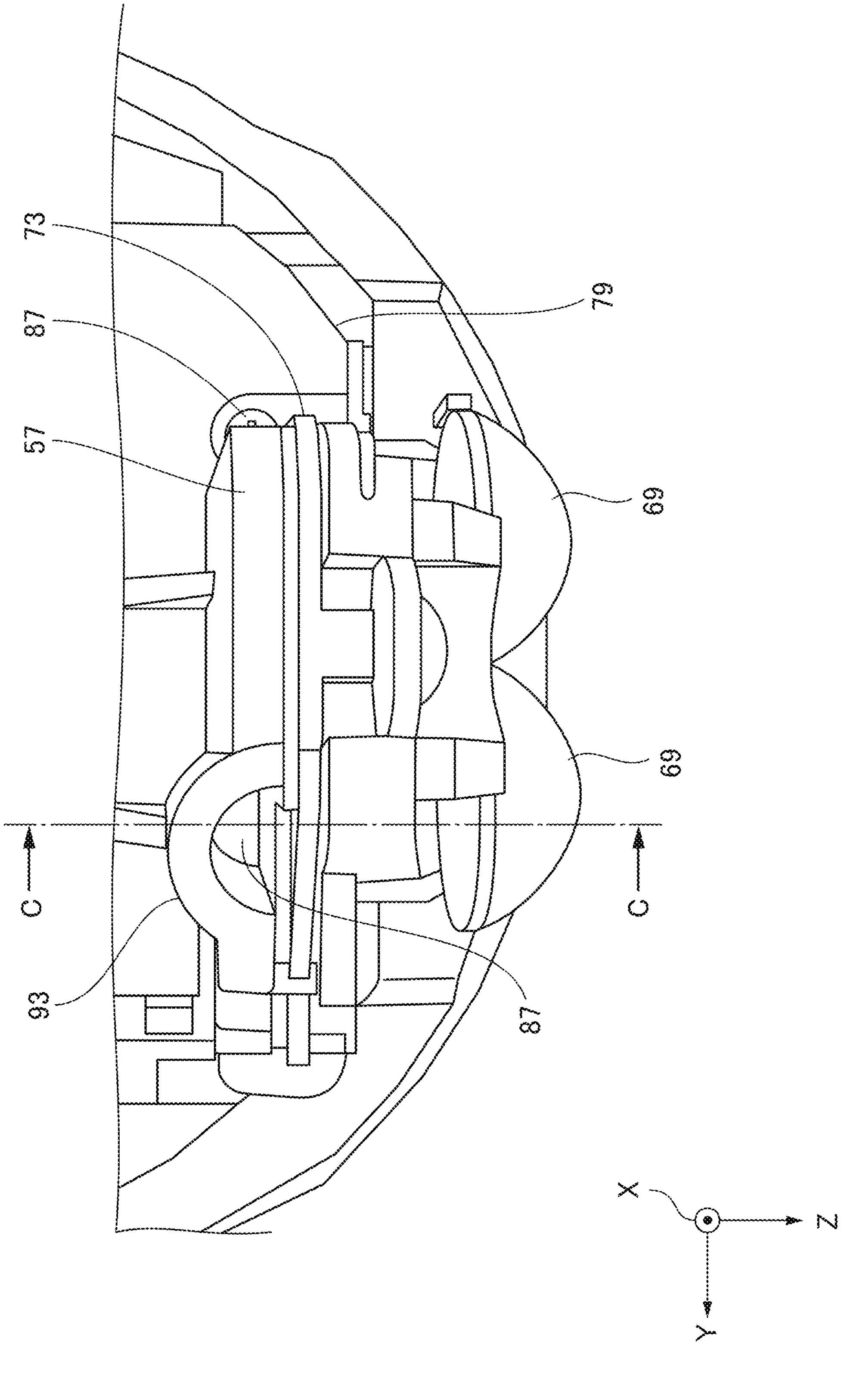
FIG. 14 is an enlarged view of a section B shown in FIG. 11, viewed from a downwardly shifted perspective.
Figure 15:
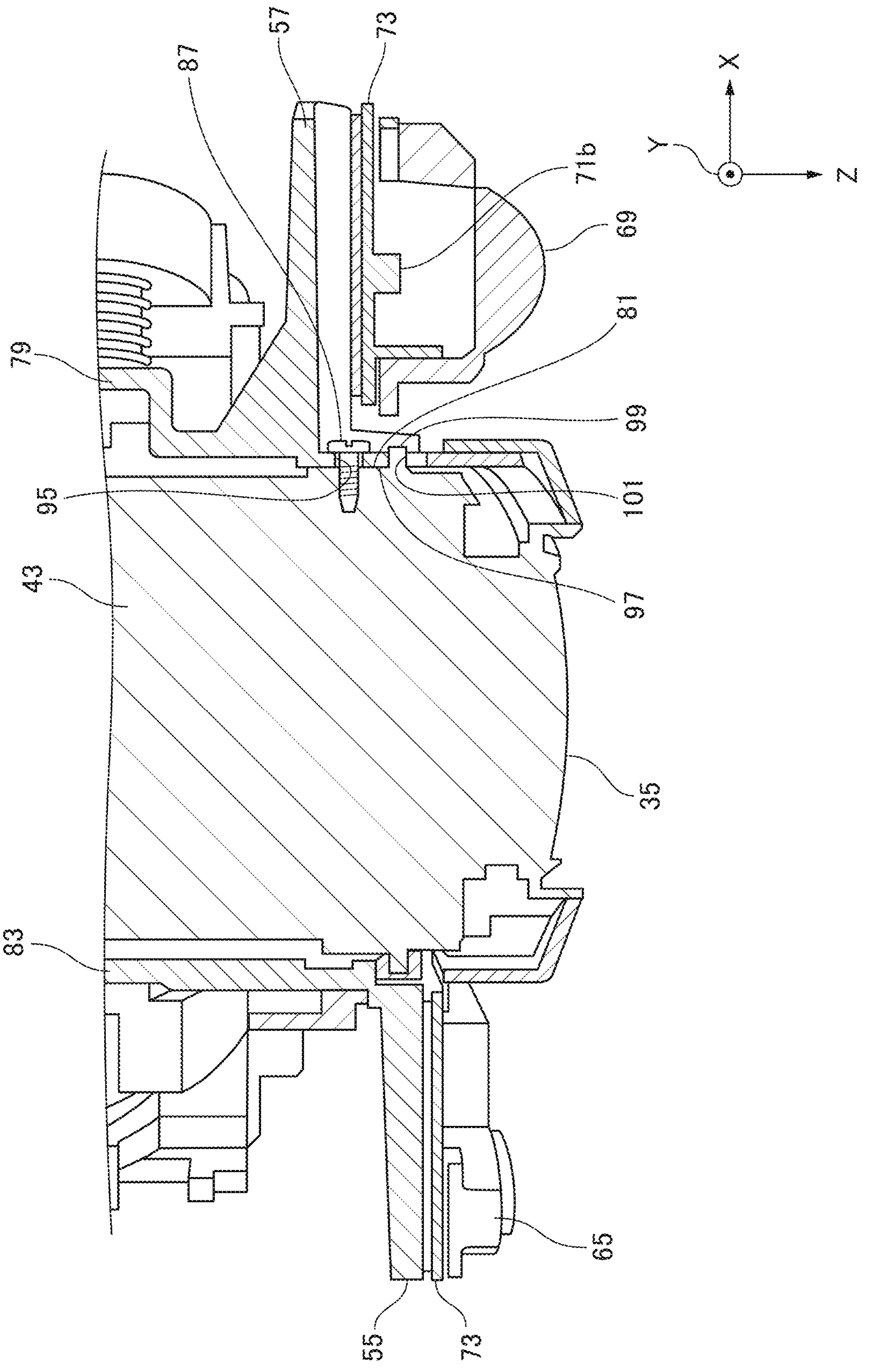
FIG. 15 is a diagram showing a C-C cross section in FIG. 14.

FIG. 14 is an enlarged view of a section B shown in FIG. 11, viewed from a downwardly shifted perspective. FIG. 15 is a diagram showing a C-C cross section in FIG. 14. The second LED pedestal 57 fixed to the narrow-angle side fitting 79 is provided with a semi-cylindrical wall portion 93 for fastening the screw 87 to the camera unit body 43 in the left direction. Before the illumination board 73 is attached to the semi-cylindrical wall portion 93, the screw 87 passes through the narrow-angle side fitting 79 in the left direction and is fastened to the camera unit body 43.

The screw 87 inserted into a through hole 95 in the left direction from the semi-cylindrical wall portion 93 shown in FIG. 14 is fastened to the camera unit body 43 by passing through the narrow-angle side fitting 79 at a pedestal base end vicinity portion 97 from which the second LED pedestal 57 extends. Accordingly, the pedestal base end vicinity portion 97 of the narrow-angle side fitting 79 abuts and is fixed to the reference surface 81 of the camera unit body 43. A positioning hole 101 into which a positioning pin 99 protruding from the reference surface 81 is fitted is bored in the pedestal base end vicinity portion 97. The pedestal base end vicinity portion 97 is positioned in the Y and Z directions with respect to the reference surface 81 of the camera unit body 43 by fitting the positioning pin 99 into the positioning hole 101.

Figure 16:
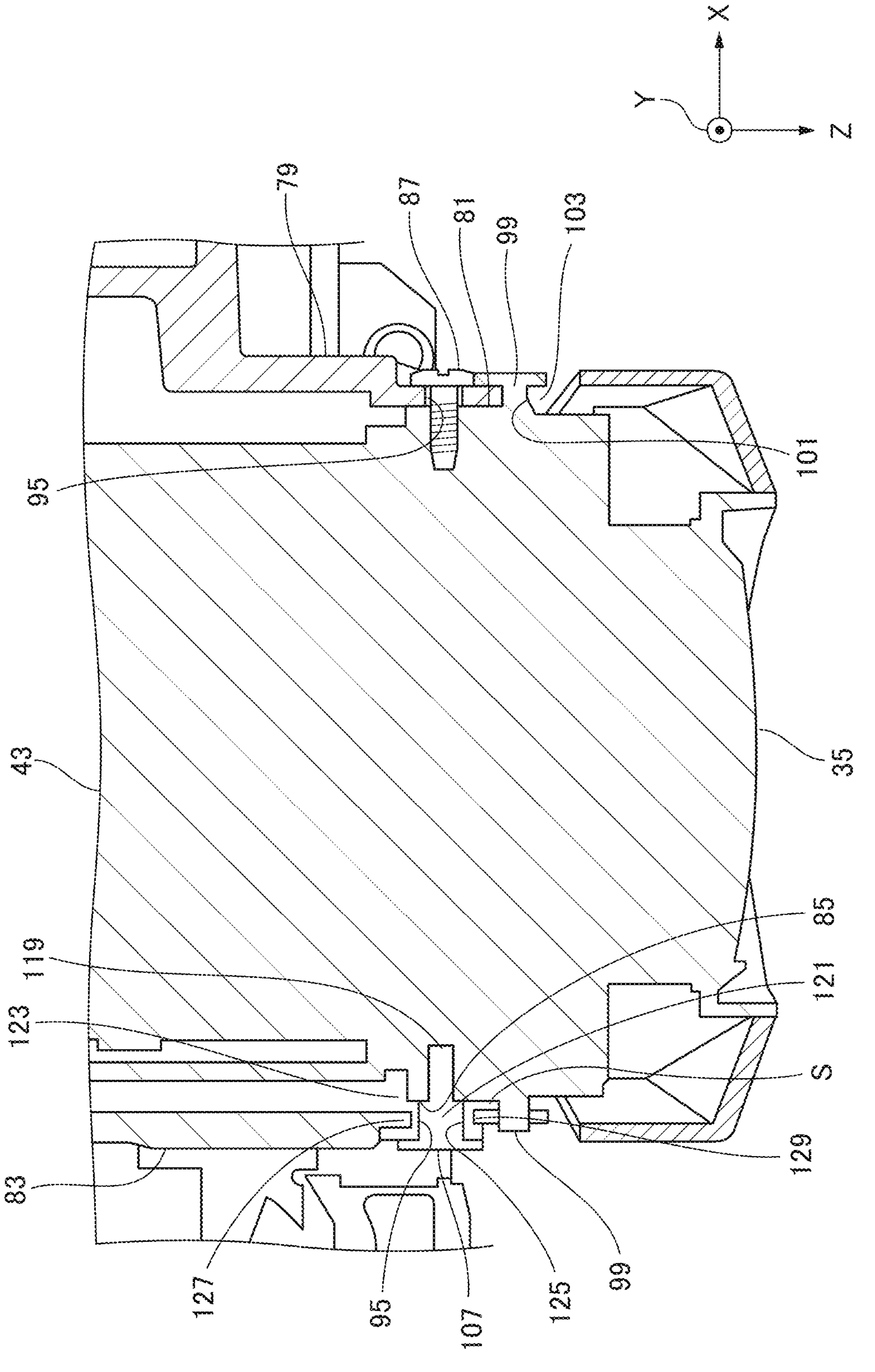
FIG. 16 is a diagram showing a D-D cross section in FIG. 11.

FIG. 16 is a diagram showing a D-D cross-section in FIG. 11. In the narrow-angle side fitting 79, a through hole 95 is bored in a right side plate lower portion 103. The positioning hole 101 is bored in the vicinity of the through hole 95. The screw 87 inserted into the through hole 95 of the right side plate lower portion 103 passes through the narrow-angle side fitting 79 and is fastened to the camera unit body 43. Accordingly, the right side plate lower portion 103 of the narrow-angle side fitting 79 abuts and is fixed to the reference surface 81 of the camera unit body 43. The right side plate lower portion 103 is positioned in the Y and Z directions with respect to the reference surface 81 of the camera unit body 43 by fitting the positioning pin 99 into the positioning hole 101.

Figure 17:
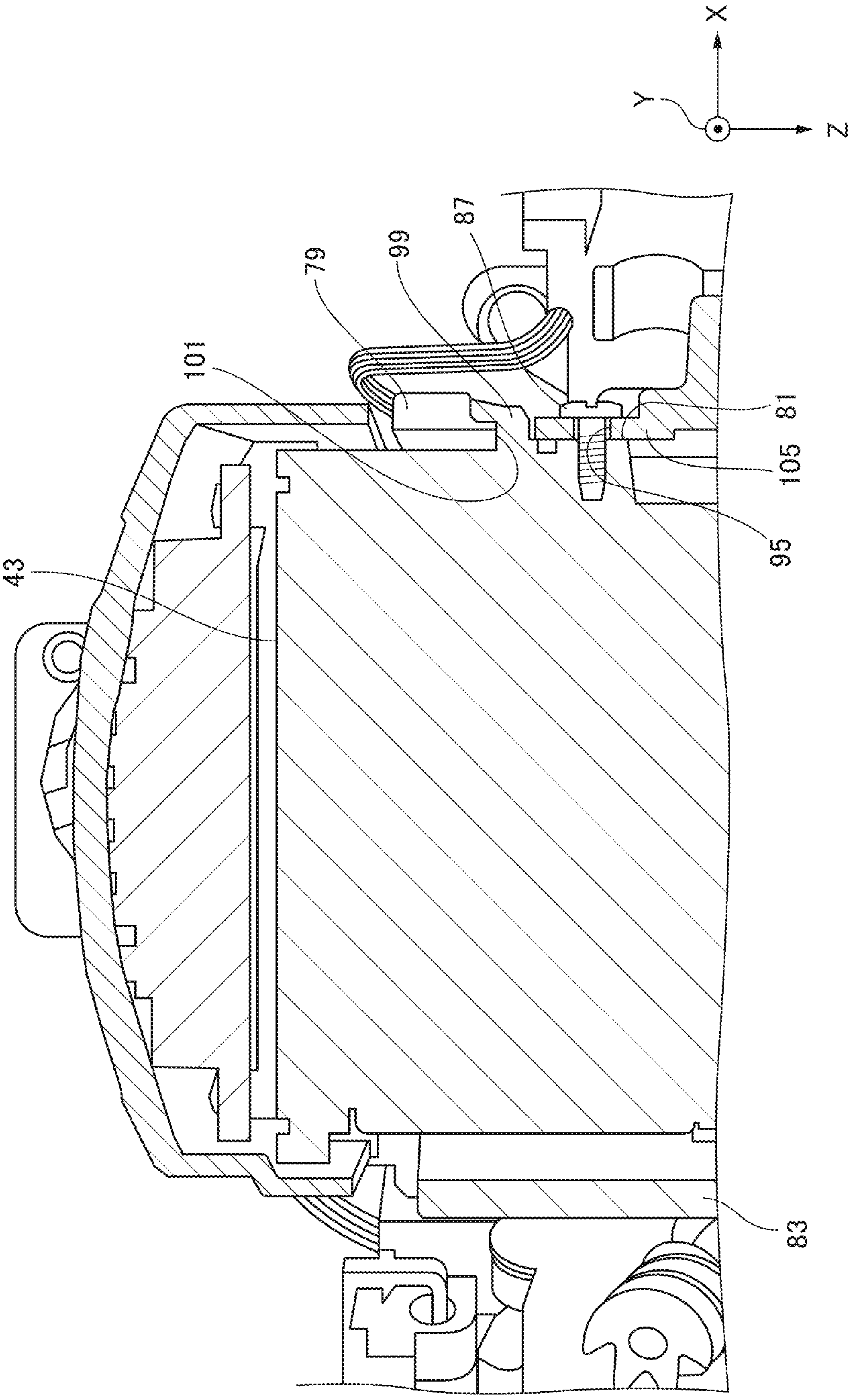
FIG. 17 is a diagram showing an E-E cross section in FIG. 11.

FIG. 17 is a diagram showing an E-E cross section in FIG. 11. In the narrow-angle side fitting 79, a through hole 95 is bored in a right side plate upper portion 105. The positioning hole 101 is bored in the vicinity of the through hole 95. The screw 87 inserted into the through hole 95 of the right side plate upper portion 105 passes through the narrow-angle side fitting 79 and is fastened to the camera unit body 43. Accordingly, the right side plate upper portion 105 of the narrow-angle side fitting 79 abuts and is fixed to the reference surface 81 of the camera unit body 43. The right side plate upper portion 105 is positioned in the Y and Z directions with respect to the reference surface 81 of the camera unit body 43 by fitting the positioning pin 99 into the positioning hole 101.

Figure 18:
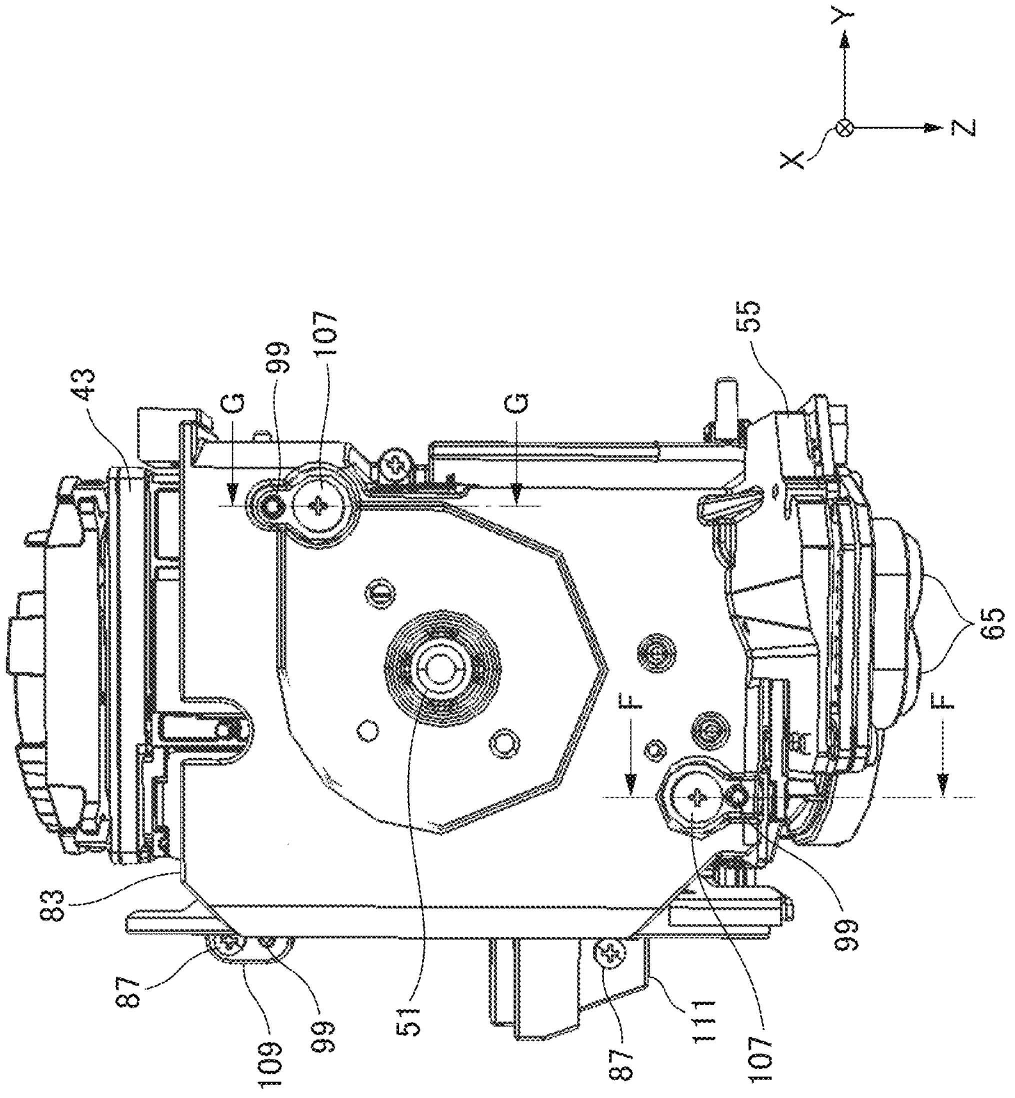
FIG. 18 is a perspective view of the camera unit body with the wide-angle side fitting attached, viewed from a left side.
Figure 19:
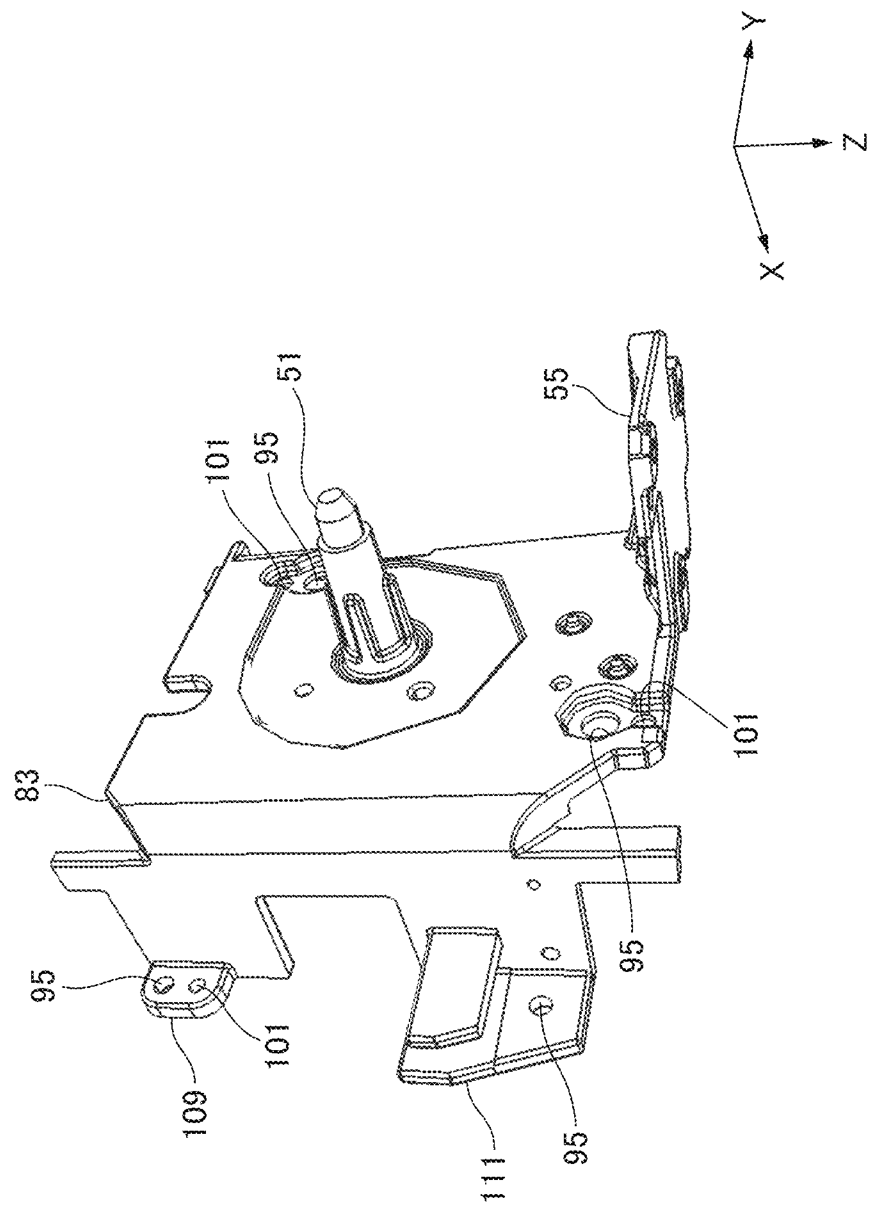
FIG. 19 is a perspective view of a left side surface of the wide-angle side fitting, viewed diagonally from the rear side.
Figure 20:
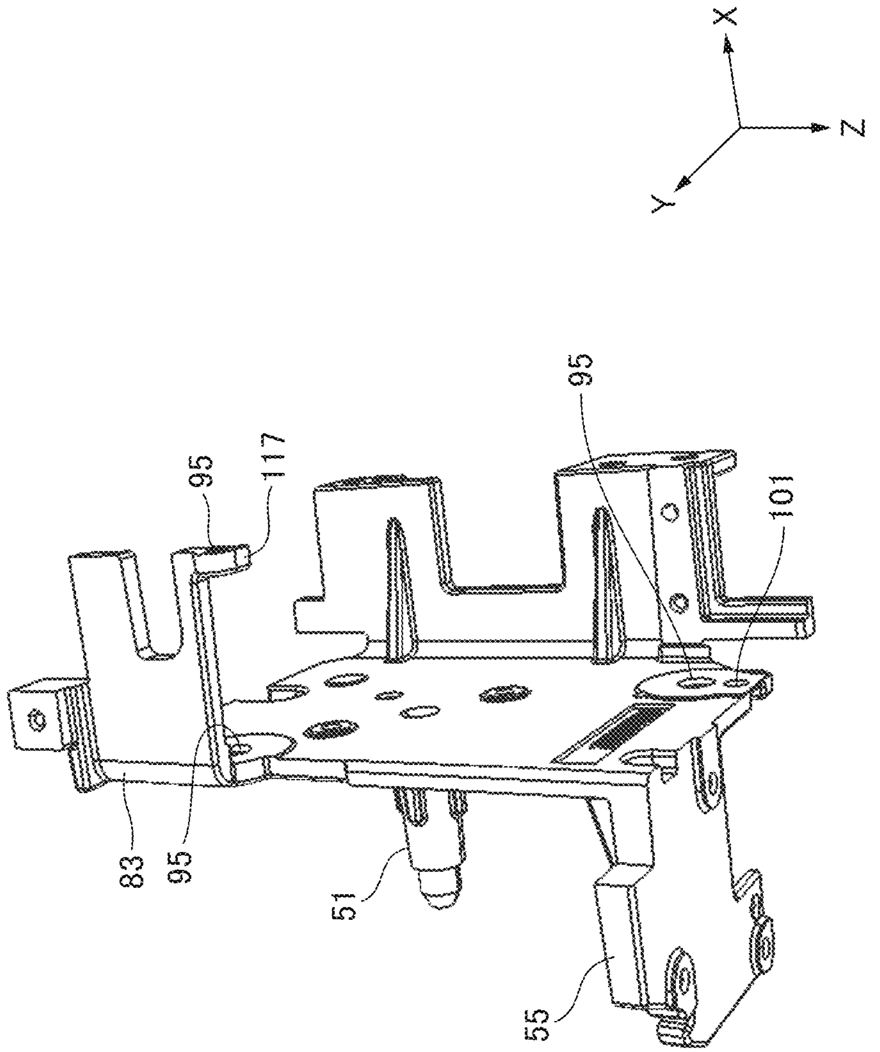
FIG. 20 is a perspective view of a front surface of the wide-angle side fitting, viewed diagonally in a lower front side.
Figure 21:
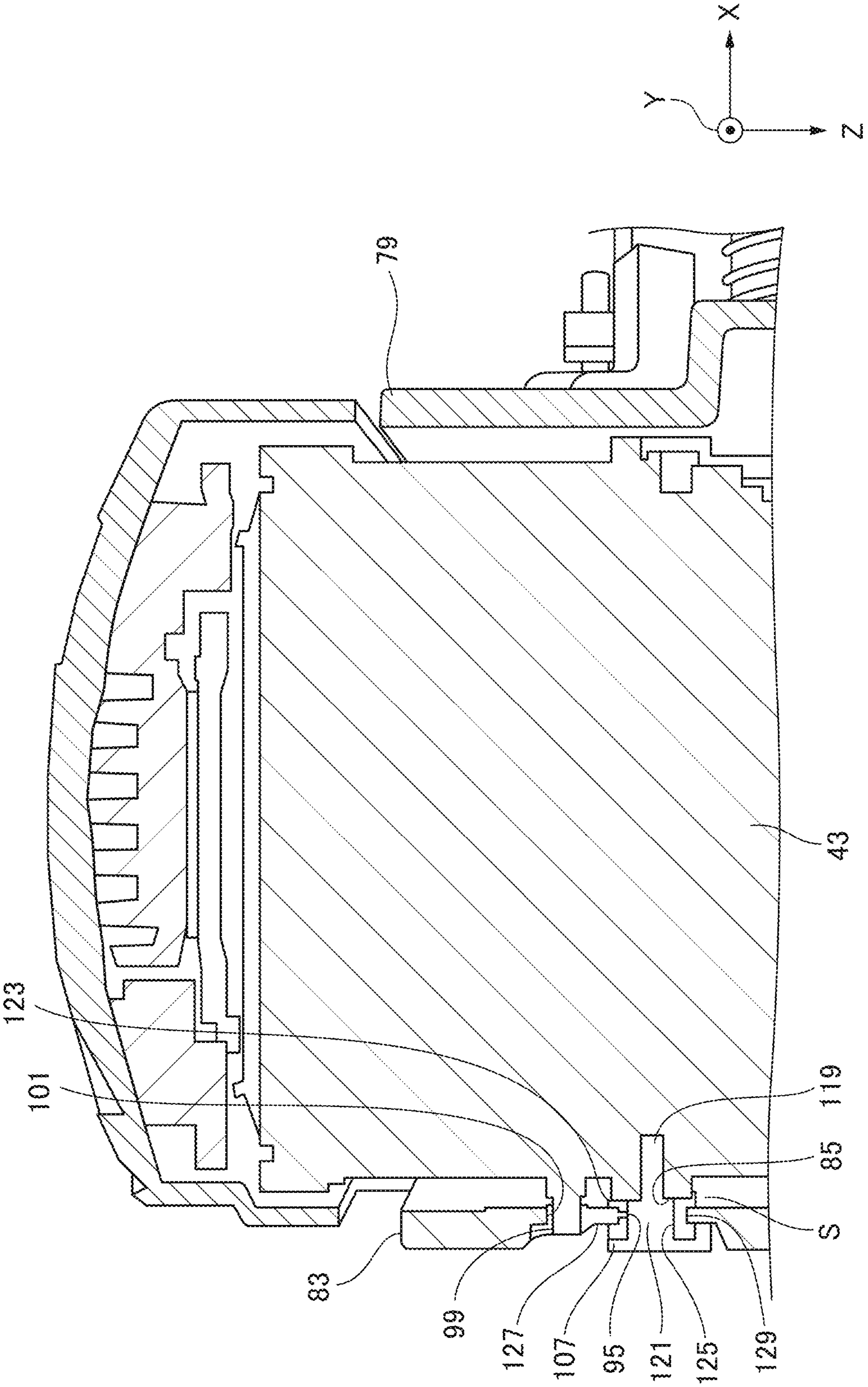
FIG. 21 is a diagram showing a G-G cross section in FIG. 18.

FIG. 18 is a perspective view of the camera unit body 43 with the wide-angle side fitting 83 attached, viewed from the left side. FIG. 19 is a perspective view of a left side surface of the wide-angle side fitting 83, viewed diagonally from the rear side. FIG. 20 is a perspective view of a front surface of the wide-angle side fitting 83, viewed diagonally in a lower front side. FIG. 21 is a diagram showing a G-G cross section in FIG. 18.

The left side surface of the wide-angle side fitting 83 is fixed to the camera unit body 43 by stepped screws 107 in which one is at a lower location and the other is at an upper location. In the wide-angle side fitting 83, an upper fixing piece 109 and a lower fixing piece 111 protrude rearward for fixing the wide-angle side fitting 83 at an upper location and a lower location to the narrow-angle side fitting 79 shown in FIG. 10. The through hole 95 and the positioning hole 101 are formed in each of the upper fixing piece 109 and the lower fixing piece 111. The upper fixing piece 109 is fixed to an upper fixed piece 113 of the narrow-angle side fitting 79 shown in FIG. 13. The lower fixing piece 111 is fixed to a lower fixed piece 115 of the narrow-angle side fitting 79 shown in FIG. 13. The screws 87 are inserted into the through holes 95 bored in the upper fixing piece 109 and the lower fixing piece 111. The positioning pins 99 protruding from the upper fixed piece 113 and the lower fixed piece 115 are fitted into the positioning holes 101 bored in the upper fixing piece 109 and the lower fixing piece 111.

A fixing leg portion 117 fixed to the boss portion 91 of the narrow-angle side fitting 79 shown in FIG. 9 is formed on the wide-angle side fitting 83. The through hole 95 into which the screw 87 is inserted is bored in the fixing leg portion 117. The fixing leg portion 117 is fixed to the narrow-angle side fitting 79 by fastening the screw 87 inserted into the through hole 95 to the boss portion 91 (see FIG. 9).

In the wide-angle side fitting 83, an F-F cross section of the stepped screw 107 shown in FIG. 18 is shown at the position of the stepped screw 107 shown in FIG. 16. As shown in FIG. 16, the stepped screw 107 has a step between a small-diameter male threaded portion 119 on a tip end side and a large-diameter neck portion 121 continuous to a head portion. A rubber washer 123 is attached to the through hole 95 into which the stepped screw 107 is inserted. The rubber washer 123 is formed into a cylindrical shape having an inner hole 125, and a circumferential groove 129 into which an inner diameter portion 127 of the through hole 95 is fitted is formed in an outer circumferential surface. The rubber washer 123 is attached to the through hole 95 by fitting the circumferential groove 129 into the inner diameter portion 127 of the through hole 95. The neck portion 121 of the stepped screw 107 inserted into the inner hole 125 passes through the rubber washer 123 attached to the through hole 95. When the male threaded portion 119 of the stepped screw 107 passing through the inner hole 125 is fastened to the dependent surface 85 of the camera unit body 43, the inner diameter portion 127 of the through hole 95 is sandwiched by the rubber washer 123, and thus a gap S can be generated between the camera unit body 43 and the wide-angle side fitting 83. That is, the wide-angle side fitting 83 is fixed with a gap between the wide-angle side fitting 83 and the dependent surface 85 of the camera unit body 43.

In the G-G cross section, as in the F-F cross section, the stepped screw 107 is inserted into the inner hole 125 of the rubber washer 123 whose circumferential groove 129 is fitted into the inner diameter portion 127 of the through hole 95, and is fastened to the dependent surface 85 of the camera unit body 43. Therefore, as described above, since the wide-angle side fitting 83 sandwiches the inner diameter portion 127 of the through hole 95 with the rubber washer 123, the gap S can be generated between the camera unit body 43 and the wide-angle side fitting 83. That is, the wide-angle side fitting 83 is fixed with a gap between the wide-angle side fitting 83 and the dependent surface 85 of the camera unit body 43.

In this way, by providing the gap between the camera unit body 43 and the dependent surface 85, it is possible to prevent the camera unit body 43 from being drawn to the dependent surface 85 when the camera unit body 43 or the dependent surface 85 expands due to a temperature rise, for example. Accordingly, it is possible to prevent that the camera unit body 43 is drawn to the dependent surface 85 and a position of the imaging lens 35 disposed inside the camera unit body 43 changes, and to prevent a change in a distance or inclination of the narrow-angle lens 69 with respect to the lens center axis 39.

A light shielding sheet may be disposed between the LED 71*b* and the imaging lens 35. More specifically, with reference to FIG. 8B, a light shielding sheet 80*a* may be disposed along a side surface of the front cover 47 and on a surface of the narrow-angle side fitting 79 below the second LED pedestal 57. An installation position of the light shielding sheet 80*a* is not limited to the above-described disposing position, and may be between the LED 71*b* and the imaging lens 35. In addition, a light shielding sheet 80*b* may be disposed, for example, along a surface, facing side surfaces of the narrow-angle side fitting 79 and the front cover 47, of the narrow-angle lens 69, or along an inner circumferential surface of the narrow-angle lens 69. Accordingly, light leaking from between the LED 71*b* and the narrow-angle lens 69 can be prevented from entering the imaging lens 35, and deterioration in an image quality of an image captured by the surveillance camera 11 can be prevented.

Figure 25:
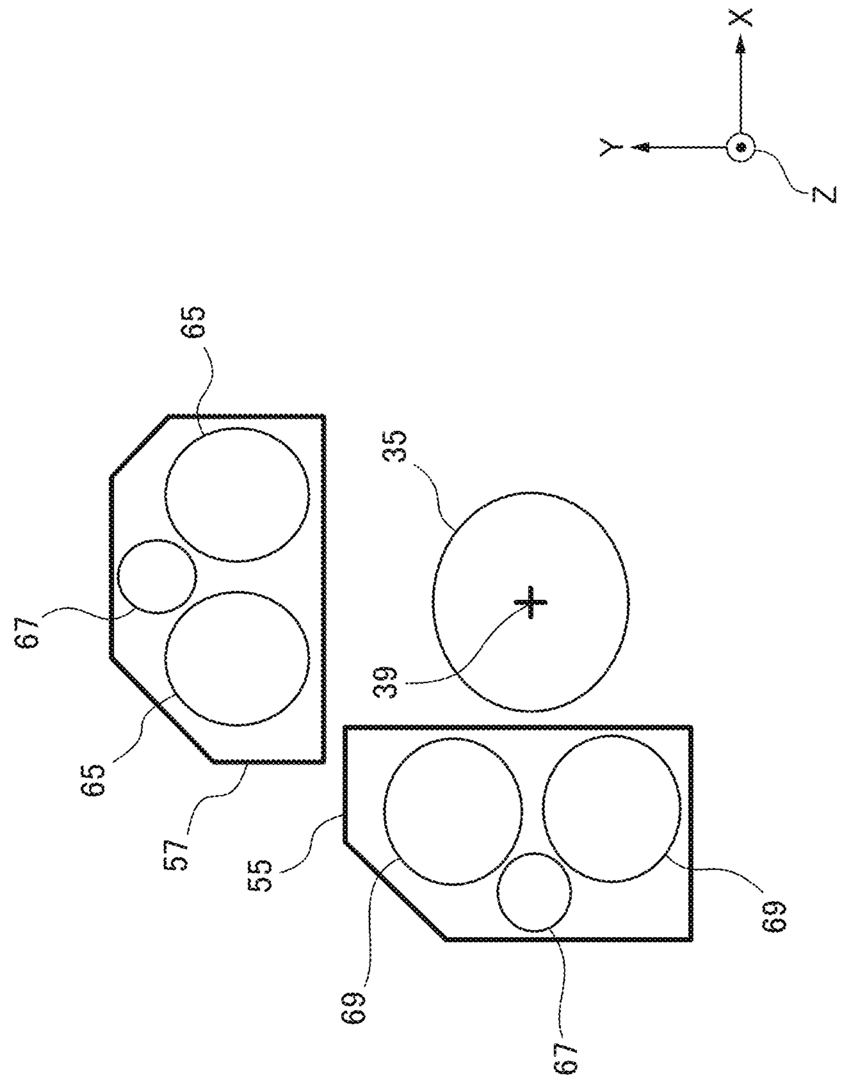
FIG. 25 is a schematic diagram showing a further modification of lens disposing.

FIG. 25 is a schematic diagram showing a modification of lens disposing. Specifically, in the example of FIG. 25, a pedestal on which the narrow-angle lenses 69 and the intermediate lens 67 are collected is disposed on the left side, and a pedestal on which the wide-angle lenses 65 and the intermediate lens 67 are collected is disposed on the front side. That is, the first LED pedestal 55 and the second LED pedestal 57 do not have to be provided symmetrically with respect to the camera body 33. The first LED pedestal 55 and the second LED pedestal 57 are not limited to the example shown in FIG. 25, and may be disposed on the left side and the rear side, the front side and the rear side, the right side and the lower side, or the right side and the front side. Accordingly, a degree of freedom in disposing the first LED pedestal 55 and the second LED pedestal 57 is improved depending on a size of a space within the case of the surveillance camera 11.

Next, effects of the above-described configuration will be described.

The surveillance camera 11 according to the first embodiment includes the first infrared irradiation portion that irradiates first infrared light (infrared light that passes through the wide-angle lenses 65 in FIG. 7), the second infrared irradiation portion that irradiates the second infrared light (infrared light that passes through the narrow-angle lenses 69 in FIG. 7) having a narrower irradiation angle than that of the first infrared light, the imaging lens 35 into which light from the irradiation region of at least one of the first infrared light and the second infrared light is incident, the camera body 33, and the dome cover 25 that covers the camera body 33. A direction along the lens center axis 39 of the imaging lens 35 is the up-down direction, a direction along the tilt axis 37 is the left-right direction, and a direction perpendicular to the lens center axis 39 and the tilt axis 37 is a front-rear direction. The first infrared irradiation portion includes at least the first light source (the LED 71*a*) and the first pedestal (the first LED pedestal 55) on which the first light source (the LED 71*a*) of the first infrared light is placed. The second infrared irradiation portion includes at least the second light source (the LED 71*b*) and the second pedestal (the second LED pedestal 57) on which the second light source (the LED 71*b*) of the second infrared light is placed. The first pedestal (the first LED pedestal 55) and the second pedestal (the second LED pedestal 57), which are provided adjacent to a side surface of the camera body 33, are disposed differently in the up-down direction. The first light source (the LED 71*a*) and the second light source (the LED 71*b*) may be disposed differently in the up-down direction. The surveillance camera 11 is not limited to a so-called PTZ camera, and may be a fixed camera that does not perform pan rotation or tilt rotation.

In the surveillance camera 11, the first light source (the LED 71*a*) and the second light source (the LED 71*b*) may be provided in a manner of sandwiching the camera body 33 in a left-right direction.

In the surveillance camera 11 according to the first embodiment, the first LED pedestal 55 and the second LED pedestal 57 are provided in a manner of sandwiching the camera body 33 in the left-right direction. The camera body 33 includes the imaging lens 35. That is, the first LED pedestal 55 and the second LED pedestal 57 are disposed with the lens center axis 39 of the camera body 33 sandwiched. A plurality of same LEDs (for example, LEDs 71*a* and 71*b*) are disposed on each of the first LED pedestal 55 and the second LED pedestal 57.

Both LEDs 71*a* and 71*b* have the same luminous intensity. The LEDs 71*a* and 71*b* constitute illumination portions by providing emission lenses between the LEDs 71*a* and 71*b* and the subject. Therefore, the wide-angle illumination portion 59 (the first infrared irradiation portion) including the wide-angle lens 65 with a wide emission angle has a low emission intensity and a short irradiation distance. On the other hand, the narrow-angle illumination portion 63 (the second infrared irradiation portion) including the narrow-angle lens 69 with a narrow emission angle has a high emission intensity and a long irradiation distance.

Figure 22:
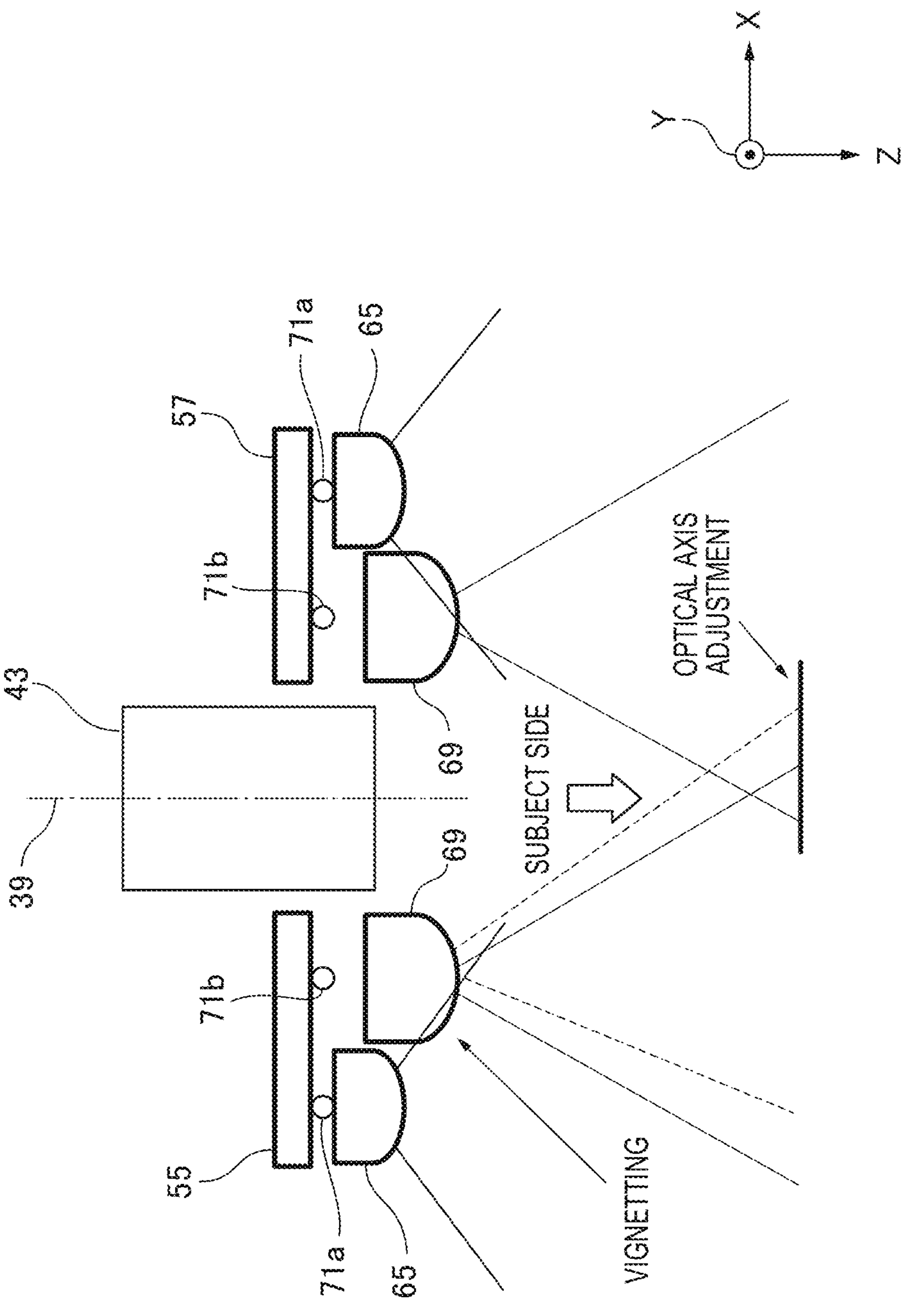
FIG. 22 is a schematic diagram of a configuration according to Comparative Example 1, in which wide-angle lenses and narrow-angle lenses are symmetrically arranged on left and right LED pedestals, viewed from the front.

FIG. 22 is a schematic diagram of a configuration according to Comparative Example 1, in which the wide-angle lenses 65 and the narrow-angle lenses 69 are symmetrically arranged on the left and right LED pedestals, viewed from the front. In FIG. 22, a pair of the wide-angle lens 65 and the narrow-angle lens 69 are disposed on each of the left and right LED pedestals. That is, the pairs of the wide-angle lenses 65 and the narrow-angle lenses 69 are disposed at the same height in the up-down direction and symmetrically on the left and right sides with the camera unit body 43 at the center. In the configuration according to Comparative Example 1 in FIG. 22, when the illumination by the wide-angle lens 65 with a short back focal length enters a part of the narrow-angle lens 69 with a long back focal length, vignetting may occur in the image captured by the camera unit body 43.

Figure 23:
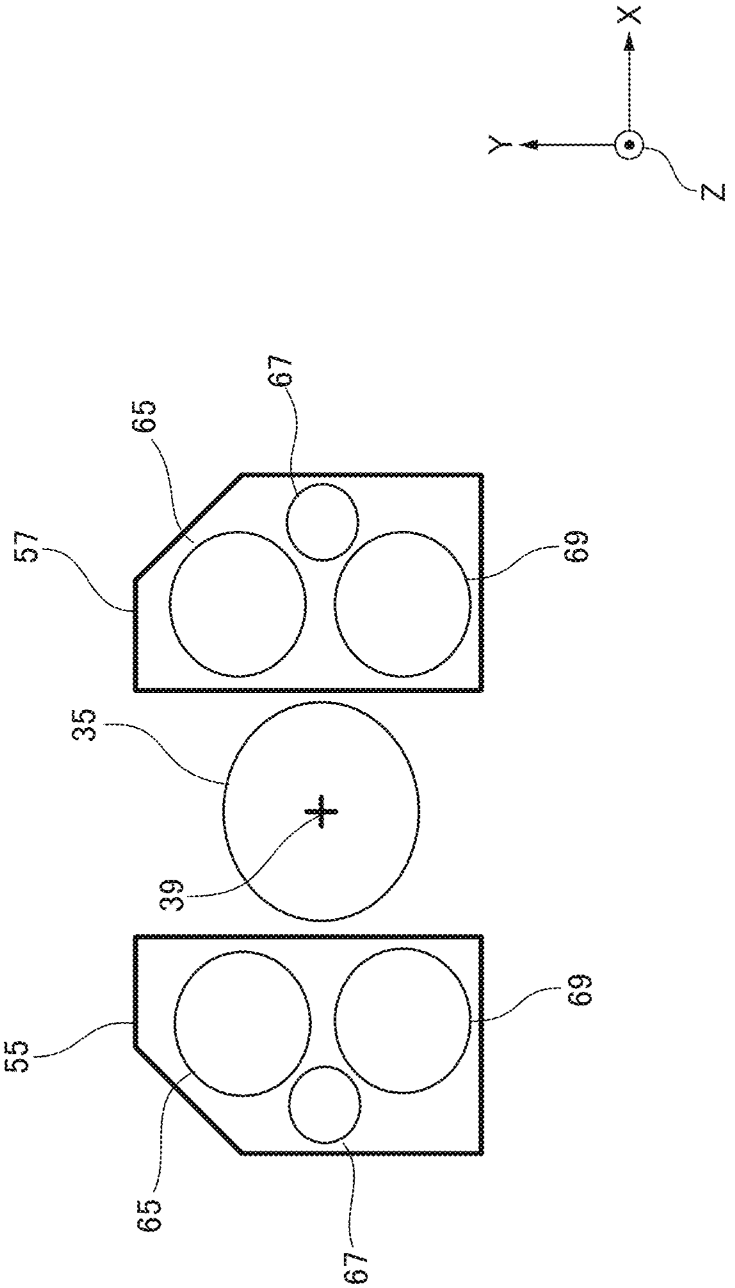
FIG. 23 is a schematic diagram of a configuration according to Comparative Example 2, in which wide-angle lenses, narrow-angle lenses, and intermediate lenses are symmetrically arranged on the left and right LED pedestals, viewed from a lower side.

FIG. 23 is a schematic diagram of a configuration according to Comparative Example 2, in which the wide-angle lenses 65, the narrow-angle lenses 69, and the intermediate lenses 67 are symmetrically arranged on the left and right LED pedestals, viewed from the lower side. In the configuration according to Comparative Example 2, it is necessary to provide several types (specifically, three types) of lenses with different back focal lengths on each of the left and right LED pedestals. Therefore, it is difficult to match each irradiation direction with respect to the imaging lens 35. That is, it takes time and effort to adjust the optical axis. Since the LEDs need to be adjusted on the left and right sides, there is a problem in that the number of lead wires increases.

Figure 24:
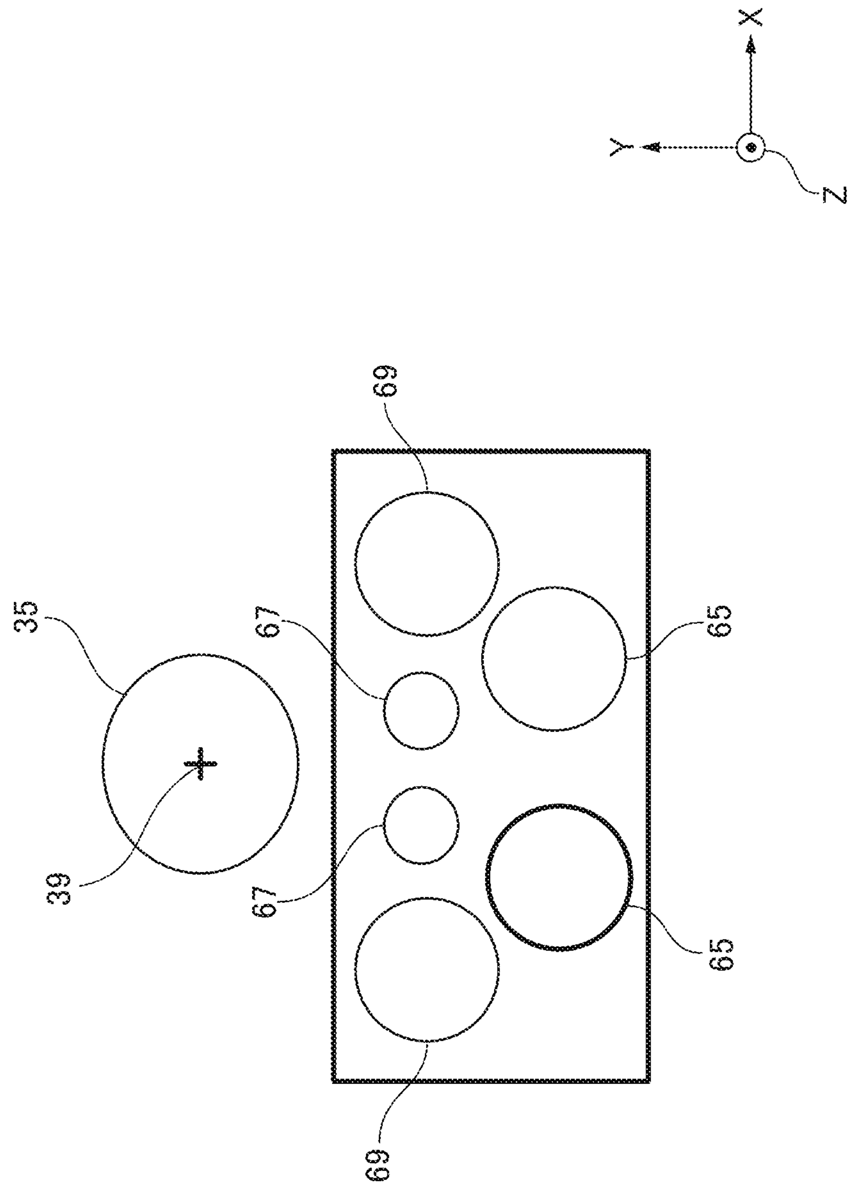
FIG. 24 is a schematic diagram of a configuration according to Comparative Example 3, in which wide-angle lenses, narrow-angle lenses, and intermediate lenses are symmetrically arranged on one LED pedestal, viewed from a lower side.

FIG. 24 is a schematic diagram of a configuration according to Comparative Example 3, in which the wide-angle lenses 65, the narrow-angle lenses 69, and the intermediate lenses 67 are symmetrically arranged on one LED pedestal, viewed from a lower side. In the configuration according to Comparative Example 3 in which only one pedestal is used, the pedestal must be arranged in the front-rear direction with respect to the imaging lens 35, and thus, when a tilt rotation mechanism is taken into consideration, a problem arises in that an outer diameter of the camera increases. The pedestal becomes enlarged relative to the imaging lens 35, resulting in poor design balance.

In this regard, in the surveillance camera 11, as shown in FIG. 7, the first LED pedestal 55 and the second LED pedestal 57 are disposed differently in the up-down direction. The up-down direction here is a direction along the lens center axis 39. Therefore, a distance between the subject and the LED 71*a* disposed on the first LED pedestal 55 and a distance between the subject and the LED 71*b* disposed on the second LED pedestal 57 are different. That is, either the left or right LED 71*a* or LED 71*b* is raised upward (that is, retreated to a position far from the subject). Accordingly, the surveillance camera 11 has an increased degree of freedom in disposing lenses, and has an improved degree of design freedom in making an overall structure more compact and preventing vignetting.

For example, as shown in FIG. 7, the narrow-angle illumination portion 63 having the narrow-angle lens 69 with a high emission intensity and a long irradiation distance has a longer back focal length (BF) and a larger required pupil diameter than those of the wide-angle illumination portion 59. Therefore, when the wide-angle illumination portion 59 and the narrow-angle illumination portion 63 are provided on the same installation plane as shown in FIG. 22, the narrow-angle lens 69 of the narrow-angle illumination portion 63 protrudes greatly toward the subject, causing vignetting.

In this regard, in the surveillance camera 11, since the first LED pedestal 55 and the second LED pedestal 57 are disposed differently in the up-down direction, the left and right lenses can be disposed separately, and the degree of freedom in disposing the lenses can be increased. For example, it is possible to choose to dispose, on the pedestal on the upper side (the side farther from the subject), the narrow-angle illumination portion 63 which includes the narrow-angle lens 69 that largely protrudes toward the subject. The wide-angle illumination portion 59 is disposed on the lower side (the side closer to the subject), making it easier to achieve a suitable irradiation angle. Accordingly, vignetting of the wide-angle illumination emitted from the wide-angle lens 65 of the wide-angle illumination portion 59 can be prevented by the narrow-angle lens 69 that largely protrudes toward the subject (that is, the degree of design freedom is improved).

Since the narrow-angle illumination portion 63 including the narrow-angle lens 69 has a long irradiation distance, when a plurality of narrow-angle illumination portions 63 are provided, overlapping of the irradiation regions must be considered. In the configuration according to Comparative Example 1 shown in FIG. 22 in which the wide-angle lenses 65 and the narrow-angle lenses 69 are symmetrically arranged on the left and right LED pedestals, since optical axis adjustment is required for the two narrow-angle lenses 69 spaced apart with the camera unit body 43 sandwiched, component required precision becomes higher for each pedestal, increasing costs.

In this regard, in the first LED pedestal 55 and the second LED pedestal 57, which have different positions in the up-down direction, of the surveillance camera 11, the narrow-angle illumination portions 63 with long back focal lengths (BF) shown in FIG. 7 are collected on the pedestal on the upper side (the side farther from the subject) and disposed as shown in FIG. 4, so that it is only necessary to ensure the component required precision for the pedestal on one side (the right side). That is, it is possible to reduce the number of components having high component required precision while preventing vignetting, thereby reducing manufacturing costs. Since the narrow-angle illumination portions 63 with long back focal lengths can be collected on the pedestal on the upper side, the lens center axes 39 of the narrow-angle illumination portions can be brought close to each other, and it becomes easy to superimpose the illumination, that is, to narrow an angle of illumination. As a result, in the surveillance camera 11, by collecting the narrow-angle lenses 69, which require more precision, on one of the first LED pedestal 55 and the second LED pedestal 57, severe optical axis adjustment can be performed only on one side, and high component required precision can be achieved only on one side.

The first light source (the LED 71*a*) is disposed closer to the dome cover 25 than the second light source (the LED 71*b*).

In the surveillance camera 11, the first light source (the LED 71*a*) is disposed closer to the dome cover 25 than the second light source (the LED 71*b*). A distance between the narrow-angle lens 69 and the LED 71*b* is set longer than a distance between the wide-angle lens 65 and the LED 71*a*. Therefore, by disposing the LED 71*a* closer to the dome cover 25 than the LED 71*b*, the narrow-angle lens 69 does not collide forward and interference with the dome cover 25 is less likely to occur.

In the surveillance camera 11, the wide-angle lens 65 that emits light from the first light source (the LED 71*a*) at a wide angle is disposed on the first pedestal (first LED pedestal 55). The narrow-angle lens 69 that emits light from the second light source (the LED 71*b*) at a narrower angle than that of the wide-angle lens 65 is disposed on the second pedestal (the second LED pedestal 57) that is closer to the dome cover 25 than the first pedestal (the first LED pedestal 55).

In this surveillance camera 11, the wide-angle lens 65 is disposed on the first LED pedestal 55 on the lower side (the side closer to the subject), and the narrow-angle lens 69 is disposed on the second LED pedestal 57 on the upper side (the side farther from the subject) than the first LED pedestal 55. Accordingly, by using different illumination lenses in the surveillance camera 11, it is possible to freely design the emission intensity and an irradiation angle according to target specifications. The narrow-angle lens 69 is required to emit the necessary emission intensity over a long distance. Therefore, the vertex V of the lens becomes higher from the installation surface 77, and an aperture tends to increase.

In the surveillance camera 11, by disposing, on the upper side (on the side farther from the subject), a lens installation surface (that is, the second LED pedestal 57) on a narrow-angle lens side, the narrow-angle lens 69 does not collide forward, which also contributes to minimizing the overall structure. Since the wide-angle lens 65 and the narrow-angle lens 69 can be separated and separately disposed on the first LED pedestal 55 and the second LED pedestal 57, it is possible to dispose the lenses in a way of easily presenting individual characteristics thereof, and vignetting between lenses can be easily considered.

In the surveillance camera 11, the distance between the wide-angle lens 65 and the first light source (the LED 71*a*) is shorter than the distance between the narrow-angle lens 69 and the second light source (the LED 71*b*).

In the surveillance camera 11, the distance between the narrow-angle lens 69 and the LED 71*b*, that is, the back focal length is set longer than the distance between the wide-angle lens 65 and the LED 71*a*, that is, the back focal length. In the surveillance camera 11, since the lens installation surface on the narrow-angle lens side is disposed on the upper side as described above, forward collision of the narrow-angle lens 69 can be prevented even if the back focal length of the narrow-angle lens 69 is set to be longer. Accordingly, it is possible to set the emission intensity of the narrow-angle illumination portion 63 provided with the narrow-angle lens 69 to be higher than that of the wide-angle illumination portion 59, while employing the LEDs 71*a* and 71*b* having the same luminous intensity. As a result, compared to a case where the illumination portions are implemented by using LEDs with different specifications and illumination lenses with different specifications, since the LEDs 71*a* and 71*b* having the same specifications can be used, a plurality of components can be standardized and shared, and product costs can be reduced.

In the surveillance camera 11, a vertex position of the narrow-angle lens 69 is closer to the subject in the irradiation region of at least one of the first infrared light and the second infrared light than a vertex position of the wide-angle lens 65.

In the surveillance camera 11, the vertex position of the narrow-angle lens 69 is located closer to the subject than the vertex position of the wide-angle lens 65, that is, on the lower side (the side closer to the subject). In other words, the vertex position of the narrow-angle lens 69 is located closer to the dome cover 25 than the vertex position of the wide-angle lens 65. In the surveillance camera 11, the camera body 33 and the two pedestals sandwiching the camera body 33 are covered by the same dome cover 25. The central imaging lens 35 is covered by the imaging window portion 27 that is a part of the dome cover 25. The first LED pedestal 55 and the second LED pedestal 57 on the left and right sides sandwiching the camera body 33 are covered by the two light projecting window portions 29 that are two side parts of the imaging window portion 27.

Here, the narrow-angle illumination portion 63 including the narrow-angle lens 69 is disposed on the second LED pedestal 57 (farther from the subject) higher than the wide-angle illumination portion 59 including the wide-angle lens 65. Since the narrow-angle illumination portion 63 has a long back focal length, a larger housing space in the up-down direction than that of the wide-angle illumination portion 59 is required. Therefore, the narrow-angle illumination portion 63 is disposed (subjected to a limit design) such that the narrow-angle lens 69 is as close to the light projecting window portion 29 as possible. Accordingly, the position of the second LED pedestal 57 can be determined.

On the other hand, the wide-angle illumination portion 59 whose back focal length is shorter than that of the narrow-angle illumination portion 63 can be housed in a housing space smaller than that of the narrow-angle illumination portion 63. Therefore, the first LED pedestal 55 provided with the wide-angle illumination portion 59 can be disposed (on the side closer to the subject) lower than the second LED pedestal 57. By disposing the wide-angle lens 65 at a position where the wide-angle lens 65 does not collide forward father than the narrow-angle lens 69 and at a position in the up-down direction where vignetting does not occur, vignetting can be prevented without impairing overall compactness of the device. In other words, the wide-angle lens 65 can be provided in any position in the up-down direction as long as the wide-angle lens 65 does not collide forward farther than the narrow-angle lens 69 and does not cause vignetting.

In the surveillance camera 11, three light sources are disposed on the first pedestal (the first LED pedestal 55), and three light sources are disposed on the second pedestal (the second LED pedestal 57). Two first light sources (the LEDs 71*a*) of the three light sources, the two wide-angle lenses 65 corresponding to the first light sources, one remaining light source (LED) of the three light sources, one intermediate lens 67 that illuminates one intermediate distance subject corresponding to the remaining one light source are disposed on the first pedestal (the first LED pedestal 55). Two second light sources (the LEDs 71*b*) of the three light sources, the two narrow-angle lenses 69 corresponding to the second light sources, one remaining light source (LED) of the three light sources, one intermediate lens 67 that illuminates one intermediate distance subject corresponding to the remaining one light source are disposed on the second pedestal (the second LED pedestal 57).

In the surveillance camera 11, the illumination lens includes three types of lenses, that is, the wide-angle lens 65, the intermediate lens 67, and the narrow-angle lens 69. That is, it is possible to project light at a wide-angle short distance, an intermediate distance, and a narrow-angle long distance.

In the surveillance camera 11, even if there are two or more types of target specifications, there is no need to separately select the LEDs 71 according to the target. Accordingly, there is an advantage in that the product costs can be reduced by disposing performance adjustment lenses (that is, the wide-angle lens 65, the intermediate lens 67, and the narrow-angle lens 69) according to specifications for one type of the LED 71.

In addition, the wide-angle lenses 65 are collected on one of the left and right sides, and the narrow-angle lenses 69 are collected on the other of the left and right sides. Therefore, by collecting the lenses on each side, adjustment is easier and the number of components that require precision can be reduced. Furthermore, by providing the intermediate lenses 67 at the left and right sides, it is possible to prevent the LED pedestal on one side from becoming enlarged, and it is also possible to avoid thermal constraints from occurring on one of the left and right sides. That is, exhaust heat of the LED 71 can be evenly distributed to the left and right LED pedestals.

The surveillance camera 11 further includes the narrow-angle side fitting 79 in which the second pedestal (the second LED pedestal 57) is formed on one end side and the second pedestal (the second LED pedestal 57) is fixed by abutting the camera body 33.

In the surveillance camera 11, the narrow-angle side fitting 79 in which the second LED pedestal 57 is formed on one end side is directly fixed to the camera body 33. The camera body 33 is rotatably supported about the tilt axis with respect to the camera case 21. The tilt axis 37 includes the main shaft 53 protruding from a right side surface of the camera body 33 and the driven shaft 51 protruding coaxially with the main shaft 53 from a left side surface of the camera body 33.

The main shaft 53 is formed on the narrow-angle side fitting 79 in which the second LED pedestal 57 is formed. The narrow-angle side fitting 79 is directly fixed to the camera body 33 using a fastening member such as the screw 87. The camera body 33 is provided with the reference surface 81 whose position relative to the lens center axis 39 is determined with high precision. By fixing the narrow-angle side fitting 79 to the reference surface 81, the second LED pedestal 57 can be positioned with high precision with respect to the lens center axis 39.

Accordingly, the narrow-angle illumination portion 63 (that is, the LED 71 and the narrow-angle lens 69) attached to the second LED pedestal 57 formed on the narrow-angle side fitting 79 is positioned with high precision with respect to the lens center axis 39 and can be attached.

The surveillance camera 11 further includes the wide-angle side fitting 83 in which the first pedestal (the first LED pedestal 55) is formed on one end side and the first pedestal (first LED pedestal 55) is fixed to the camera body 33 with an intermediate member (the rubber washer 123) interposed.

In the surveillance camera 11, the wide-angle side fitting 83 in which the first LED pedestal 55 is formed on one end side is indirectly fixed to the camera body 33 with the intermediate member interposed. The driven shaft 51 is formed on the wide-angle side fitting 83. The wide-angle side fitting 83 protrudes from the dependent surface 85 of the camera body 33. The protruding wide-angle side fitting 83 is fixed to the camera body 33 via intermediate members (dependent components).

The dependent components are, for example, the narrow-angle side fitting 79 and the rubber washer 123. The wide-angle side fitting 83 is indirectly fixed to the camera unit body 43 by using fastening members such as the screws 87 on the dependent surface 85 and the narrow-angle side fitting 79 of the camera body 33. The wide-angle side fitting 83 is fixed to the dependent surface 85 of the camera body 33 via the rubber washer 123. The driven shaft 51 is slightly misaligned with the main shaft 53 due to cumulative tolerances and the like. The driven shaft 51 is supported by the dependent surface 85 so that the misalignment is absorbed by the rubber washer 123 and smooth tilt rotation is performed. That is, the wide-angle side fitting 83 has a float structure.

The first LED pedestal 55 is formed on the wide-angle side fitting 83 having the float structure. The wide-angle lens 65 and the intermediate lens 67, which have relatively lower positional precision with respect to a light projection target than that of the narrow-angle lens 69, are attached to the first LED pedestal 55.

Accordingly, the wide-angle illumination portion 59 and the intermediate-distance illumination portion 61 attached to the first LED pedestal 55 can be attached to the lens center axis 39 with lower precision than the narrow-angle illumination portion 63. As a result, in the surveillance camera 11, high component required precision can be required only on the LED pedestal on one side, and manufacturing costs can be reduced.

Although various embodiments have been described above with reference to the accompanying drawings, the present disclosure is not limited to such examples. It is apparent to a person skilled in the art that various changes, modifications, substitutions, additions, deletions, and equivalents can be conceived within the scope of the claims, and it is understood that such modifications also belong to the technical scope of the present disclosure. The respective components in the various embodiments above described may be optionally combined without departing from the gist of the invention.

INDUSTRIAL APPLICABILITY

The present disclosure is useful as a surveillance camera that can prevent occurrence of vignetting, reduce the number of components that require disposing required precision, and easily narrow an angle of illumination light.

What is claimed is:

1. A surveillance camera comprising:

a first infrared irradiation portion that irradiates first infrared light;

a second infrared irradiation portion that irradiates second infrared light having a narrower irradiation angle than the first infrared light;

a camera body including an imaging lens, the imaging lens allowing light to be incident from an irradiation region of at least one of the first infrared light and the second infrared light; and a dome cover that covers the camera body, wherein the first infrared irradiation portion includes a first light source of the first infrared light and a first pedestal on which the first light source is placed, the second infrared irradiation portion includes a second light source of the second infrared light and a second pedestal on which the second light source is placed, the first light source and the second light source, which are provided adjacent to a side surface of the camera body, are disposed differently in an up-down direction, the first pedestal and the second pedestal are disposed differently in the up-down direction, on the first pedestal, a wide-angle lens that emits light from the first light source at a wide angle is disposed, and on the second pedestal that is closer to the dome cover than the first pedestal, a narrow-angle lens that emits light from the second light source at a narrower angle than the wide-angle lens is disposed.

2. The surveillance camera according to claim 1, wherein the first light source is disposed closer to the dome cover than the second light source.

3. The surveillance camera according to claim 1, wherein a distance between the wide-angle lens and the first light source is shorter than a distance between the narrow-angle lens and the second light source.

4. The surveillance camera according to claim 1, wherein a vertex position of the narrow-angle lens is closer to the dome cover than a vertex position of the wide-angle lens.

5. The surveillance camera according to claim 1, wherein three light sources are disposed on the first pedestal, and three light sources are disposed on the second pedestal, on the first pedestal, two of the first light sources of the three light sources, two of the wide-angle lenses corresponding to the first light sources, remaining one light source of the three light sources, and one intermediate lens corresponding to the remaining one light source are disposed, and on the second pedestal, two of the second light sources of the three light sources, two of the narrow-angle lenses corresponding to the second light sources, remaining one light source of the three light sources, and one intermediate lens corresponding to the remaining one light source are disposed.

6. The surveillance camera according to claim 5, further comprising:

a narrow-angle side fitting in which the second pedestal is formed on one end side, and that fixes the second pedestal by abutting the camera body.

7. The surveillance camera according to claim 6, further comprising:

a wide-angle side fitting in which the first pedestal is formed on one end side, and that fixes the first pedestal to the camera body with an intermediate member interposed.

8. The surveillance camera according to claim 1, wherein the first light source and the second light source are provided so as to sandwich the camera body in a left-right direction.

* * * * *